United States Patent
Narendrnath et al.

(10) Patent No.: US 8,464,594 B2
(45) Date of Patent: Jun. 18, 2013

(54) MEASURING FLOW PROPERTIES OF MULTIPLE GAS NOZZLES OF A GAS DISTRIBUTOR

(75) Inventors: Kadthala R. Narendrnath, San Jose, CA (US); Ashish Bhatnagar, Fremont, CA (US); Daniel L. Martin, Cupertino, CA (US); Robert T. Hirahara, San Jose, CA (US); Gangadhar Sheelavant, Guledgudd (IN)

(73) Assignee: Applied Materials, Inc., Santa Clara, CA (US)

( * ) Notice: Subject to any disclaimer, the term of this patent is extended or adjusted under 35 U.S.C. 154(b) by 201 days.

(21) Appl. No.: 13/041,293

(22) Filed: Mar. 4, 2011

(65) Prior Publication Data

US 2011/0217208 A1   Sep. 8, 2011

Related U.S. Application Data

(60) Provisional application No. 61/311,273, filed on Mar. 5, 2010.

(51) Int. Cl.
*G01F 1/00*   (2006.01)

(52) U.S. Cl.
USPC .......................................................... 73/861

(58) Field of Classification Search
USPC ............. 73/861; 165/206; 12/203.12; 411/13
See application file for complete search history.

(56) References Cited

U.S. PATENT DOCUMENTS

| | | | |
|---|---|---|---|
| 4,320,664 A | | 3/1982 | Rehn et al. |
| 4,416,913 A | * | 11/1983 | Ingle et al. ..................... 427/585 |
| 4,997,272 A | | 3/1991 | Dopheide et al. |
| 6,453,992 B1 | * | 9/2002 | Kim ............................... 165/206 |
| 6,609,865 B2 | * | 8/2003 | Daigneault ..................... 411/13 |
| 6,647,778 B2 | | 11/2003 | Sparks |
| 6,688,156 B2 | | 2/2004 | Dietrich et al. |
| 6,819,427 B1 | | 11/2004 | Subramanian et al. |
| 6,874,480 B1 | | 4/2005 | Ismailov |
| 7,143,641 B2 | | 12/2006 | Palazzolo et al. |
| 7,290,444 B2 | | 11/2007 | Kobayashi |

(Continued)

FOREIGN PATENT DOCUMENTS

WO   WO2009070798   6/2009

OTHER PUBLICATIONS

"Pressure Sensitive Paint", Innovative Scientific Solutions, Inc.

(Continued)

*Primary Examiner* — Jewel V Thompson
(74) *Attorney, Agent, or Firm* — Ashok K. Janah; Janah & Associates, P.C.

(57) ABSTRACT

A gas nozzle measurement apparatus comprises a controllable gas source to provide across a gas plate having gas nozzles, a flow of gas at a constant pressure or constant flow rate, and a sensor plate sized to cover an area comprising at least a portion of the front face of the gas plate. The sensor plate comprises gas flow sensors arranged in locations that correspond to positions of individual gas nozzles of the gas nozzles of the gas plate such that each gas flow sensor can measure a pressure, flow rate, density, or velocity of a gas stream passing through the individual gas nozzle that faces the gas flow sensor, and generate a signal indicative of, or display, the pressure, flow rate, density, or velocity of the gas stream passing through the individual gas nozzle.

43 Claims, 7 Drawing Sheets

U.S. PATENT DOCUMENTS

| | | |
|---|---|---|
| 7,415,885 B2 | 8/2008 | Reinwald et al. |
| 7,415,940 B2 * | 8/2008 | Koshimizu et al. ....... 118/723 E |
| 7,823,587 B2 * | 11/2010 | Muller et al. ............ 128/203.12 |
| 2005/0116729 A1 | 6/2005 | Koester et al. |
| 2006/0138082 A1 | 6/2006 | Strang |
| 2007/0039548 A1 | 2/2007 | Johnson |
| 2008/0277062 A1 | 11/2008 | Koshimizu et al. |
| 2009/0032189 A1 | 2/2009 | Jeong |

OTHER PUBLICATIONS

Kim, Sang Keol, Search Report and Written Opinion, PCT/US2011/027272, Korean Intellectual Property Office, Oct. 31, 2011.

Wang, Yu-Hsiang et al., "MEMS-based gas flow sensors", Microfluid Nanofluid, 2009, vol. 6, p. 333-346.

* cited by examiner

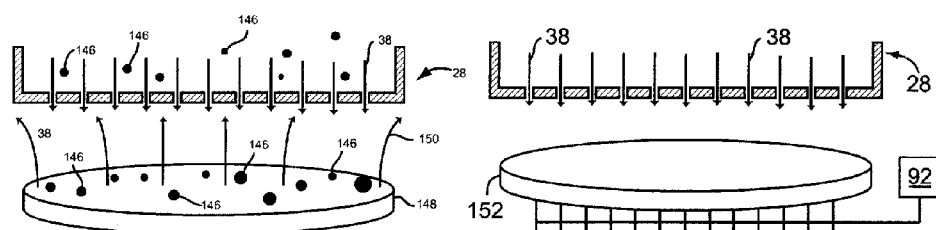
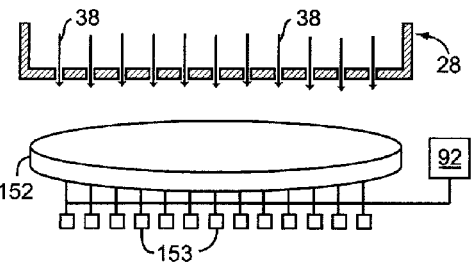
FIG. 6
FIG. 7A
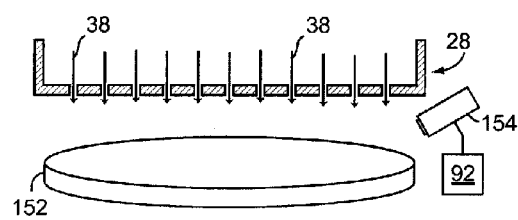
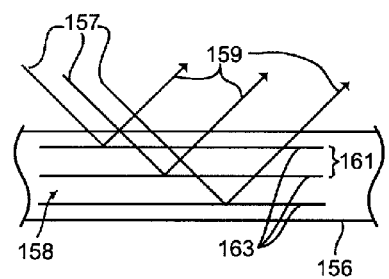
FIG. 7B
FIG. 8A
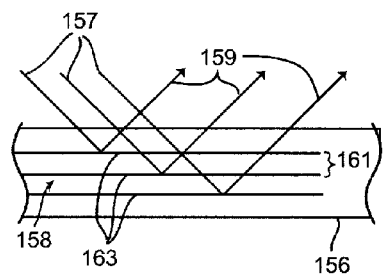
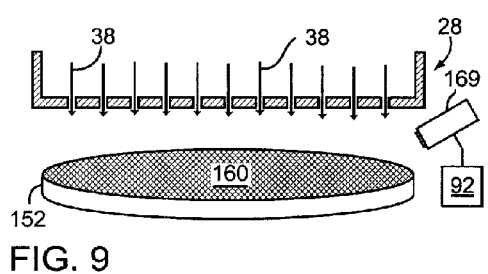
FIG. 8B
FIG. 9

MEASURING FLOW PROPERTIES OF MULTIPLE GAS NOZZLES OF A GAS DISTRIBUTOR

CROSS-REFERENCE

The present application claims priority from U.S. Provisional Application Ser. No. 61/311,273, filed on Mar. 5, 2010, which is incorporated by reference herein and in its entirety.

BACKGROUND

Embodiments of the present invention relate to the measurement of the gas flow properties of gas nozzles of a gas distributor used for distributing gas in a substrate processing apparatus.

In the fabrication of electronic circuits and displays, semiconductor, dielectric and conductor materials are deposited and patterned on a substrate, such as a silicon wafer, compound semiconductor wafer, or dielectric plate. These materials are formed by chemical vapor deposition (CVD), physical vapor deposition (PVD) processes, oxidation, nitridation, ion implantation, and other processes. For example, in CVD, a process gas is introduced into a chamber and energized by heat or RF energy to deposit a film on the substrate. In PVD, a target is sputtered with process gas to deposit a layer of target material onto the substrate. In etching, a patterned mask comprising a photoresist or hard mask, is formed on the substrate surface by lithography, and portions of the substrate surface that are exposed between the mask features are etched by an energized process gas.

In such processes, the substrate processing chambers comprise gas distributors with gas showerheads, plates and other structures, which have a plurality of gas nozzles to introduce the desired process gas in the chamber. For example, the gas distributor can comprise a showerhead having a faceplate with a large number of holes, such as, for example, from 1000 to 9000 holes. In another version, the gas plate is an annular ring with circularly spaced-apart gas nozzles, which is positioned about a sidewall of the chamber to inject gas laterally and from around the periphery of the substrate into the chamber. In another version, the gas plate comprises a circular band having from about 100 to about 500 gas nozzles that inject gas vertically into the chamber from around the perimeter of the substrate. In still a further version, the gas plate is a circular ring about the sputtering target with gas nozzles that direct gas from around the target toward the substrate.

In any of these illustrative embodiments of the gas plates, the gas pressure, flow rate, density, or velocity of a gas stream passing through a gas nozzle affects the processing uniformity of a layer being processed on the substrate. However, conventional gas plates often fail to provide a uniform gas flow distribution across the surface of the substrate being processed in the chamber. For example, the gas nozzles of a particular gas plate can generate gas streams having pressures, flow rates, or velocities that vary from one gas nozzle to another nozzle. It is believed that the gas nozzles machined into the gas plate provide such different gas flow characteristics because of small differences in the diameters or lengths of the gas nozzles. For example, the gas nozzles can have different sized diameters because the machining tool used to machine out the gas nozzles gradually wears out over a period of drilling hundreds or thousands of such holes across a gas plate. Initially, the machining tool produces holes having a fixed diameter, but as the machining tool wears out, the machined holes can have larger diameters created by a blunt tool or smaller diameters created by a worn machining tool having a smaller diameter itself. Furthermore, the gas nozzles can require machining tolerances of less than 2/10 mils, which is so tight that even a slightly worn machining tool does not meet the tolerances. A worn machining tool can also create surface defects in the sidewalls of the gas nozzles, such as burrs, cracks, and the like, as the cutting properties of the tool deteriorate.

Gas flow measuring apparatus have also been developed to measure the gas flow characteristics of individual gas nozzles of a gas plate, or even the average flow characteristics of a quadrant of the gas nozzles. For example, commonly assigned, U.S. patent application Ser. No. 11/754,244 to Sun et al., entitled "GAS FLOW CONTROL BY DIFFERENTIAL PRESSURE MEASUREMENTS", which is incorporated by reference herein and in its entirety, describes measuring the flow properties of an individual gas nozzle, or a single measurement of the average gas flow properties of an entire quadrant of nozzles, or a single measurement of all the nozzles of the entire gas plate. The described gas flow measuring apparatus uses a differential pressure measuring device which operates using a gas pressure analog of a Wheatstone bridge resistance device. However, such measuring apparatus can be relatively slow in operation when measuring the individual gas flow properties of every single gas nozzle of a gas plate having a large number of nozzles, for example, at least 100 nozzles or even at least 300 nozzles. Such an apparatus also cannot easily measure the individual properties of a large number of gas nozzles in a simultaneous, time-effective manner.

Still further, conventional techniques to measure the surface roughness, smoothness, or other quality of the inside surfaces of gas nozzles are difficult to implement. The surface smoothness or roughness of the nozzle sidewall surfaces can affect the properties of the layer being processed on the substrate. For example, gas nozzles with the rougher sidewalls can cause deposition of a slightly thinner layer on the substrate portion facing the central portion of the gas nozzle, and thicker deposition annulus facing the circumference of the nozzle. Further, when material is being etched using etchant gas emitted from gas nozzles having rough or poorly machined uneven surfaces, the substrate portion facing the center of the gas nozzle is often etched more quickly than the substrate portion facing the circumference of the gas nozzle. This unevenness in gas nozzle surfaces can occur from grain smearing effects, or when a machining tool used to form the holes of the gas nozzles gradually wears out over time, resulting in some gas nozzles having sidewalls with rougher surfaces than the nozzles which were initially machined. However, conventional surface roughness methods made with profilometers (which run a needle probe across a surface to measure its surface roughness) are difficult to implement inside the small diameters of gas nozzles without cutting open the nozzle, and often also do not provide accurate surface roughness measurements.

For various reasons that include these and other deficiencies, and despite the development of various gas nozzle measurement apparatus and methods, further improvements in the measurement of gas flow properties of individual gas nozzles are continuously being sought.

SUMMARY

A gas nozzle measurement apparatus comprises a controllable gas source to provide across a gas plate having gas nozzles, a flow of gas at a constant pressure or constant flow rate, and a sensor plate sized to cover an area comprising at least a portion of the front face of the gas plate. The sensor plate comprises gas flow sensors arranged in locations that correspond to positions of individual gas nozzles of the gas plate such that each gas flow sensor can measure a pressure, flow rate, density, or velocity of a gas stream passing through the individual gas nozzle that faces the gas flow sensor, and generate a signal indicative of, or display, the pressure, flow rate, density, or velocity of the gas stream passing through the individual gas nozzle.

Another version of a gas nozzle measurement apparatus comprises a controllable gas source to provide a flow of gas at a constant pressure or constant flow rate across gas nozzles of a gas plate and a sensor plate comprising piezoresistive pressure sensors that are capable of detecting the pressure of an impinging gas stream from a gas nozzle.

Another version of a gas nozzle measurement apparatus comprises a controllable gas source to provide a flow of gas at a constant pressure or constant flow rate across gas nozzles of a gas plate and a sensor plate comprising a substrate coated with a uniform coat of pressure-sensitive paint capable of changing in a property with application of a pressure from a gas stream from a gas nozzle of the gas plate.

Another version of a gas nozzle measurement apparatus comprises a controllable gas source to provide a flow of gas at a constant pressure or constant flow rate across gas nozzles of a gas plate and a sensor plate comprising a transparent wafer having a film heater that provides a uniform heat input to be cooled to different extents across its area depending upon the flow of the impinging gas stream from a gas nozzle.

Another version of a gas nozzle measurement apparatus comprises a controllable gas source to provide a flow of gas at a constant pressure or constant flow rate across gas nozzles of a gas plate and a sensor plate comprising a substrate having a chemically-reactive coating which reacts to produce a discernible change in color upon impingement of a gas stream from a gas nozzle of a gas plate.

Another version of a gas nozzle measurement apparatus comprises a controllable gas source to provide a flow of gas at a constant pressure or constant flow rate across gas nozzles of a gas plate and a sensor vessel comprising a viscous sensing fluid that receives a plurality of gas streams emanating from the gas nozzles of the gas plate and retains a measurement memory of the pressure, flow, density or velocity of the gas streams.

Another version of a gas nozzle measurement apparatus comprises a controllable gas source to provide a flow of gas at a constant pressure or constant flow rate across gas nozzles of a gas plate and a sensor plate comprising a plurality of microtube sensors that are each capable of sensing a pressure, flow rate, velocity or density of the gas stream, the microtube sensors being arranged in locations that correspond to positions of individual gas nozzles of the array of gas nozzles in the gas plate such that each microtube sensor can measure a pressure, flow rate, density or velocity of a gas stream passing through an individual gas nozzle that faces the microtube sensor.

Another version of a gas nozzle measurement apparatus comprises a controllable gas source to provide a flow of gas at a constant pressure or constant flow rate across gas nozzles of a gas plate and a sensor plate comprising thermochromic liquid crystal sensors capable of changing the color of reflected light based on the temperature of the gas stream such that the sensor plate can display a pressure, flow, density or velocity of a gas stream passing through an individual gas nozzle that faces the sensor plate.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of particular drawings, and the invention includes any combination of these features, where:

Figure 3A:
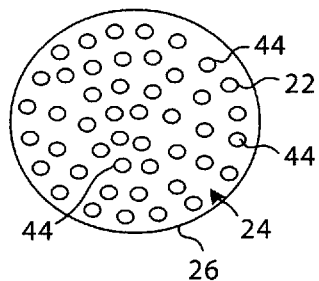
FIG. 3A is a schematic top view of a sensor plate comprising a concentric circle array of gas flow sensors.
Figure 3B:
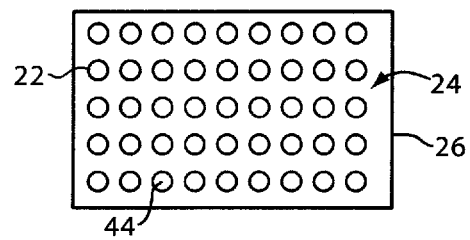
FIG. 3B is a schematic top view of a sensor plate comprising a rectangular array of gas flow sensors.
Figure 3C:
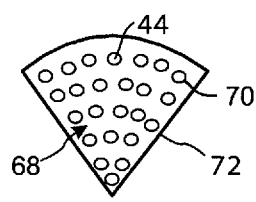
FIG. 3C is a schematic top view of a triangular sensor plate comprising a triangle with a curved perimeter with spaced apart gas flow sensors.
Figure 3D:
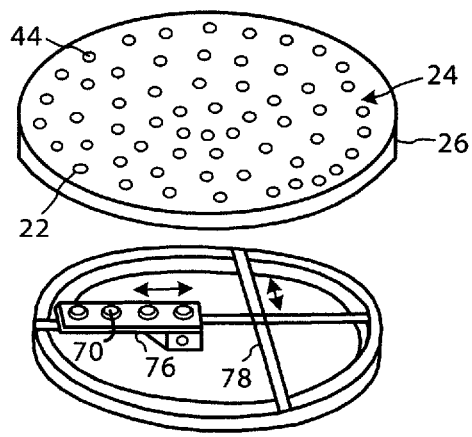
Figure 4A:
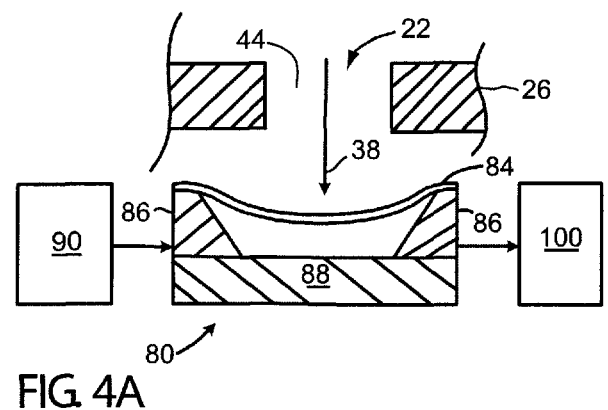
Figure 4B:
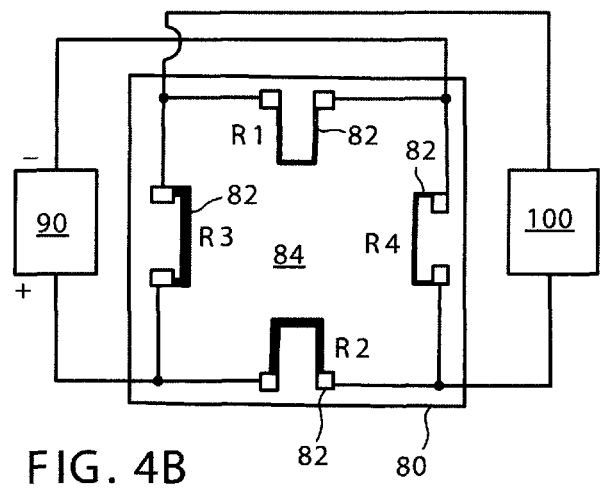
Figure 4C:
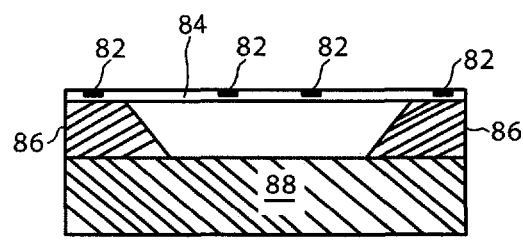
Figure 5A:
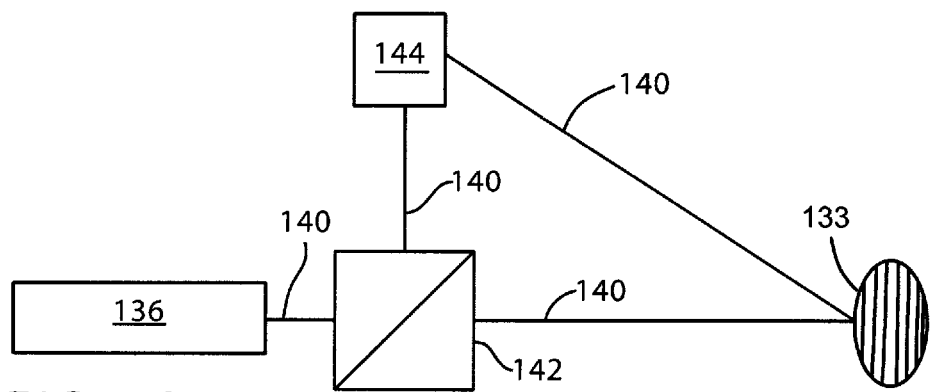
Figure 5B:
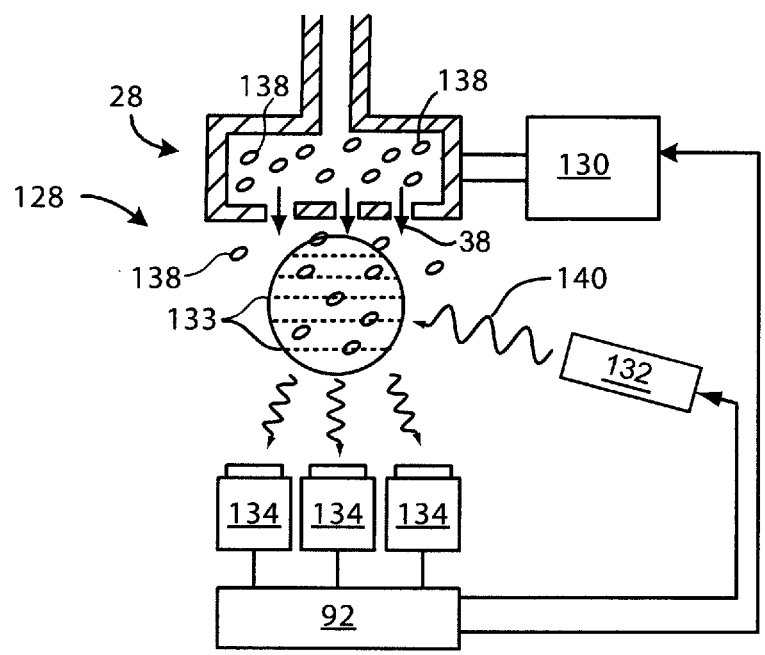
Figure 5C:
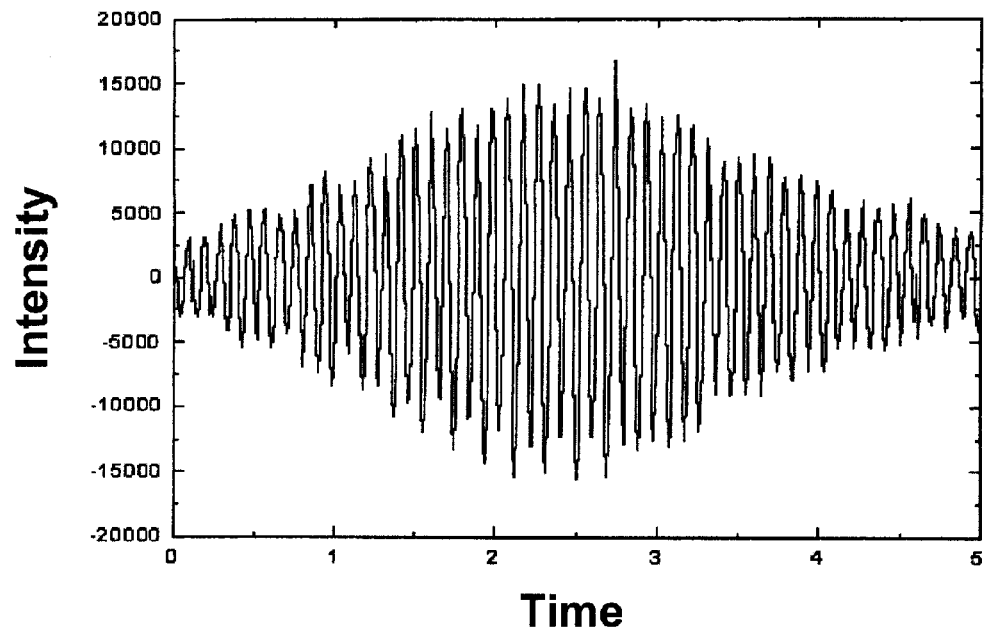
Figure 5D:
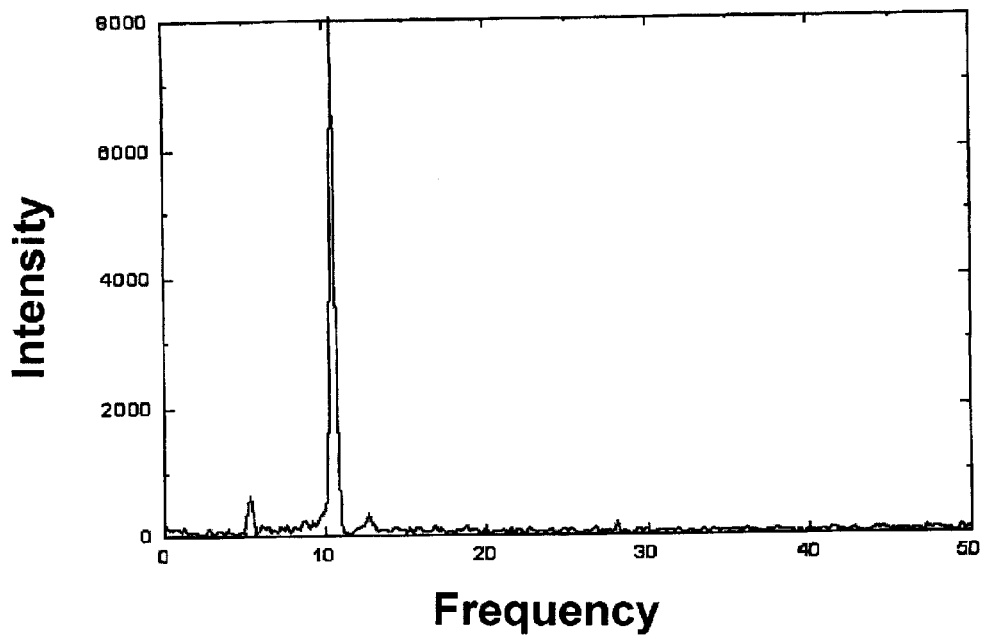
Figure 10A:
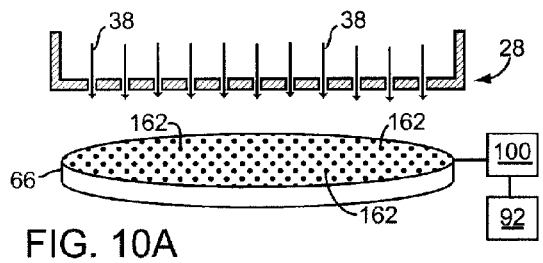
Figure 10B:
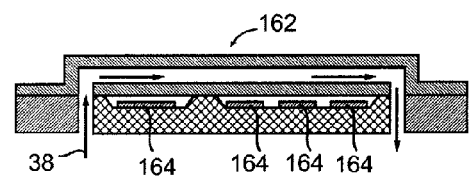
Figure 11:
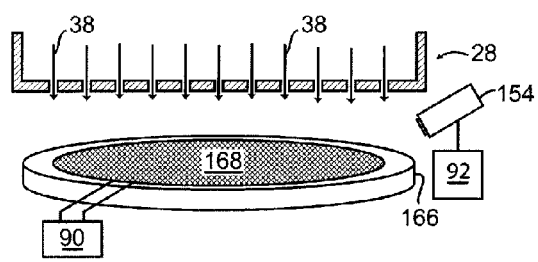
Figure 12:
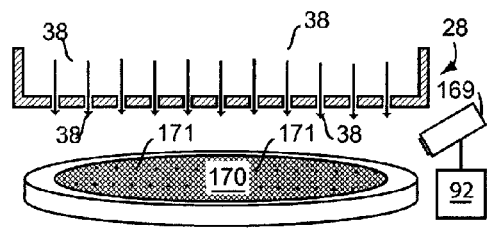
Figure 13:
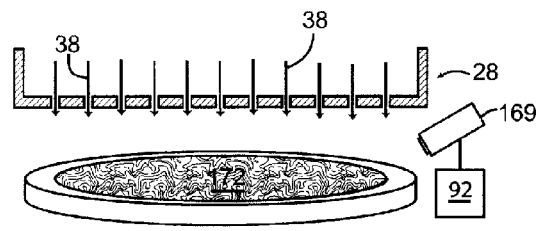
Figure 14A:
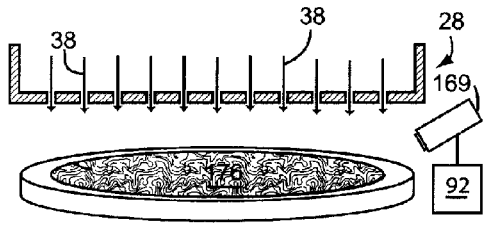
Figure 14B:
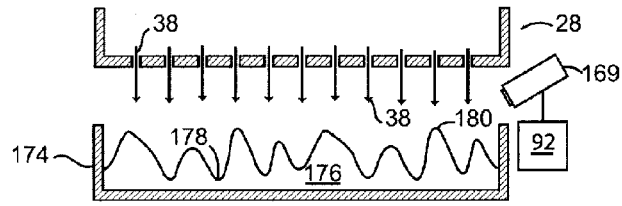

FIG. 3D a schematic, perspective diagram of a sensor plate comprising a longitudinal strip with gas flow sensors being scanned across the front face of a gas plate that is circular;

FIG. 4A is a schematic diagram of a gas sensor comprising a piezoresistive pressure sensor measuring a pressure of an impinging gas stream from a gas nozzle and related electronics;

FIG. 4B is a schematic diagram of a piezoresistive pressure sensor comprising four resistors and an electrical circuit for measuring the change in voltage across the sensor which operates as a Wheatstone bridge;

FIG. 4C is a schematic cross-sectional diagram of an embodiment of a piezoresistive pressure sensor;

FIG. 5A is a schematic block diagram of a gas nozzle measurement apparatus comprising a laser doppler interferometer that includes a laser, beam splitter, and acousto-optical modulator to generate interference fringes;

FIG. 5B is a schematic, partial cross-sectional diagram of a gas nozzle measurement apparatus comprising a laser doppler interference measuring device that includes a seed particle injector, a laser doppler interferometer, an electro-optical detector, and a signal processor;

FIG. 5C is a graph of the signal intensity of a coherent beam scattered by seed particles in a gas stream as measured by an electro-optical detector;

FIG. 5D is a graph of the Fourier transform of a signal intensity of a coherent beam scattered by seed particles in a gas stream measured by an electro-optical detector having a peak that indicates a component of velocity of the stream;

FIG. 6 is a schematic, partial cross-sectional diagram of a gas nozzle measurement apparatus comprising magnetic particles, a gas distributor, a metal plate and a magnetic field;

FIG. 7A is a schematic, partial cross-sectional diagram of a gas nozzle measurement apparatus comprising a gas distributor, thermal sensing wafer, and temperature sensors to measure the temperature distribution on the thermal sensing wafer;

FIG. 7B is a schematic, partial cross-sectional diagram of a gas nozzle measurement apparatus comprising a gas distributor, thermal sensing wafer, and an infrared camera to measure the temperature distribution of the thermal sensing wafer;

FIG. 8A is a schematic, partial cross-sectional diagram of a gas nozzle measurement apparatus comprising a thermochromic liquid crystal (TLC) plate comprising thermochromic crystals at a high temperature such that white light is reflected as red light;

FIG. 8B is a schematic, partial cross-sectional diagram of a gas nozzle measurement apparatus comprising a thermochromic liquid crystal (TLC) plate comprising thermochromic crystals at a low temperature such that white light is reflected as blue light;

FIG. 9 is a schematic, partial cross-sectional diagram of a gas nozzle measurement apparatus comprising a gas distributor, a sensor plate having pressure-sensitive paint thereon and a camera to image the surface of the plate to measure the pressure distribution on the sensor plate;

FIG. 10A is a schematic, partial cross-sectional diagram of a gas nozzle measurement apparatus comprising a gas distributor, a sensor plate comprising microtube sensors, a signal receiver, and signal processor to measure the mass flow, density or pressure of an impinging gas stream from a gas nozzle;

FIG. 10B is a schematic, cross-sectional diagram of a microtube sensor;

FIG. 11 is a schematic, partial cross-sectional diagram of a gas nozzle measurement apparatus comprising a gas distributor, a transparent wafer having a film heater, a voltage source and an infrared camera to measure the temperature distribution on transparent wafer;

FIG. 12 is a schematic, partial cross-sectional diagram of a gas nozzle measurement apparatus comprising a gas distributor having a gas flow that is mixed with an atomized or liquid chemical, a sensor plate comprising a chemically-reactive coating, and a camera to measure the pattern created in the chemically-reactive coating;

FIG. 13 is a schematic, partial cross-sectional diagram of a gas nozzle measurement apparatus comprising a gas distributor, a sensor plate having a tensioned polarizing film thereon, and a camera to measure the pattern created by the tensioned polarizing film;

FIG. 14A is a schematic, partial cross-sectional diagram of a gas nozzle measurement apparatus comprising a gas distributor, a sensor vessel having a viscous sensing fluid therein, and a camera to measure the pattern of depressions and protrusions in the viscous sensing fluid;

FIG. 14B is a cross-sectional diagram of a gas nozzle measurement apparatus comprising a gas distributor, a sensor vessel comprising a viscous sensing fluid having depressions and protrusions, and a camera.

DESCRIPTION

Figure 1A:
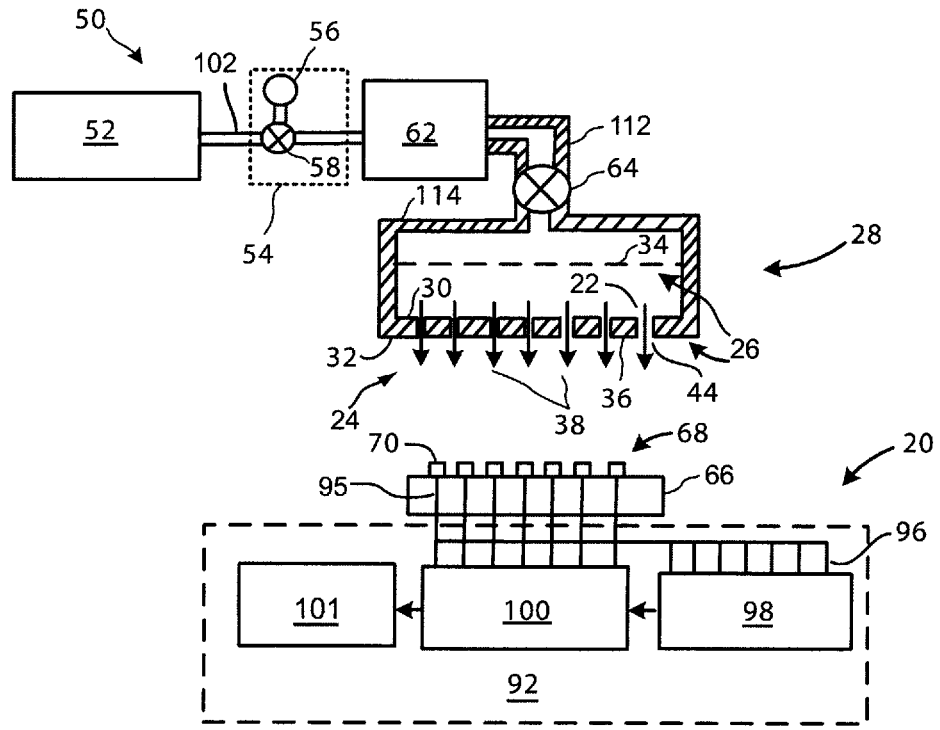
FIG. 1A is a schematic, partial cross-sectional diagram of an embodiment of a gas distributor and gas nozzle measurement apparatus.
Figure 1B:
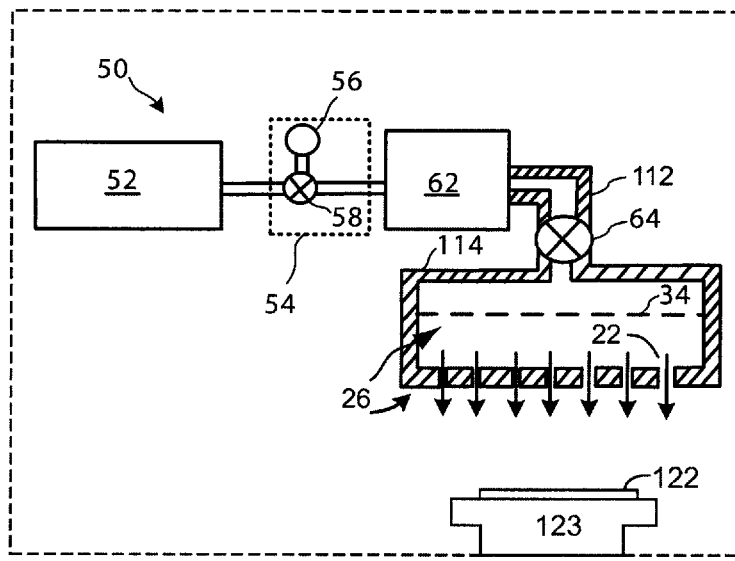
FIG. 1B is a schematic, partial cross-sectional diagram of an embodiment of a substrate process chamber including a gas distributor, substrate and substrate support.

A gas nozzle measurement apparatus 20 is useful for measuring the separate gas flow properties of individual gas nozzles 22 of an array of gas nozzles 24 of a gas distributor 28, as shown in the illustrative example of FIG. 1A. In the embodiment shown, the gas distributor 28 comprises two gas plates 26, namely, a blocker plate 34 and a faceplate 36, both of which have gas nozzles 22 that extend through the respective plates from a back face 30 to a front face 32 of each of the plates 26. The blocker plate 34 is positioned behind the faceplate 36 and serves as a baffle which partially blocks and disperses incoming streams of gases 38 and defines a mixing chamber to mix the gases into a mixed process gas, which then passes through the separate set of holes 44 of the faceplate 36 into the processing chamber 120, as shown in FIG. 1B. The gas distributor 28 comprises the assembly of the gas plates 26 as well as housing 114 and a gas inlet 112 to feed gas to a substrate processing chamber 120. The gas distributor 28 can also include other gas plate 26 structures, for example, cones having the gas nozzles 22 or arcuate surfaces having the gas nozzles 22, all of which, for the sake of convenience, are called gas plates 26 herein. In the embodiment shown, the gas plates 26 have gas nozzles 22 with diameters of from about 50 to about 5000 microns or even of from about 200 to about 1300 microns (8 mils to 50 mils). While operation of the gas nozzle measurement apparatus 20 is illustrated with reference to an embodiment of a gas plate 26, it should be understood that the gas nozzle measurement apparatus 20 can be used to measure the gas flow characteristics of the gas nozzle holes 44 of any gas distributor 28. Furthermore, the gas nozzle measurement apparatus 20 and measurement techniques can be applied to a single gas plate 26 by itself, such as the blocker plate 34 or faceplate 36, or applied to measure the effects of the combination of both the blocker plate 34 and faceplate 36, or still other structures having gas nozzles 22.

Figures 2A, 2B:
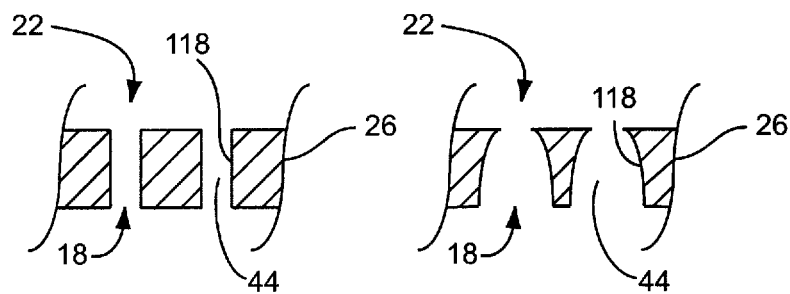
FIGS. 2A to 2D are schematic, cross-sectional diagrams of different shapes of gas nozzles.
Figures 2C, 2D:
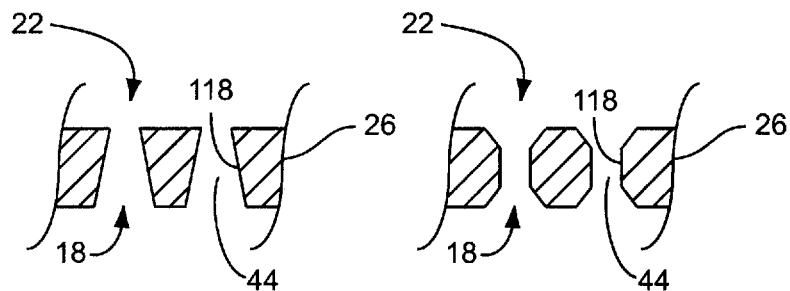

One advantage of the gas nozzle measurement apparatus 20 is that it is not restricted to measurement of gas flow properties from a particular shape of gas nozzles 22. For example, the gas nozzles 22 can have a cross-sectional profile having a uniform diameter that extends through the thickness of the gas nozzle, such as a straight right cylinder, as shown in FIG. 2A. In another version, the gas nozzles 22 can have a cross-sectional profile that varies in diameter or shape 48 across the length of the hole 44, as shown in FIG. 2B. In another version, the gas nozzles 22 have a conical cross-sectional profile, as shown in FIG. 2C. In still another embodiment, each gas nozzle 22 comprises two opposing cones connected by a short cylinder, as shown in FIG. 2D.

The gas nozzle measurement apparatus 20 uses a controllable gas source 50 to provide a flow of gas at a constant pressure or constant flow rate across the gas nozzles 22 of a gas plate 26, for example, by applying the constant pressure or flow rate gas flow across a back face 30 of the gas plate 26, during the gas nozzle measurements. A suitable controllable gas source 50 comprises a pressurized gas source 52 connected to a gas pressure controller 54 comprising a gas pressure gauge 56 and a pressure control valve 58, as shown in FIG. 1A. Alternatively, the controllable gas source 50 can also be a flow rate controller comprising a mass flow controller 62 and a flow control valve 64 by itself, or a combination of a gas pressure controller 54 and a flow rate controller, as shown in the illustrative embodiment.

In one version, the controllable gas source 50 is mounted on a gas tube 102 to set a gas flow rate or a gas pressure of the gas passing thorough the tube 102, as shown in FIG. 1A. The gas tube 102 has an inlet connected to the pressurized gas source 52 and an outlet through which the gas is passed out from the gas tube 102. The pressurized gas source 52 can be a pressurized canister of a gas and a pressure regulator to control the pressure of gas exiting the gas supply. In one version, the pressurized gas source 52 is set to provide a gas such as, for example, nitrogen, at a pressure of from about 50 to about 150 psia. The controllable gas source 50 provides gas at a selected gas pressure, flow rate, density, or velocity to the apparatus 20.

Referring to FIG. 1A, the controllable gas source 50 can include a pressurized gas source 52 connected to either a gas flow control comprising a flow meter and a flow control valve 64, or a gas pressure regulator comprising a gas pressure gauge 56 and a pressure control valve 58, or both. In one version, the flow meter is a mass flow controller 62 (MFC) or volumetric flow controller. A gas flow control feedback loop can also be used to control a flow rate of gas passing through the gas tube 102 which is commonly known as a flow control based mass flow meter. The flow rate set on the flow meter is the rate at which gas flows out of the tube outlet, and the mass flow meter monitors the gas flow rate and adjusts an internal or external valve in response to the measured flow rate to achieve a substantially constant flow rate of gas, where "substantially constant" means a flow rate that varies by less than 5%. The controllable gas source 50 provides a substantially constant gas flow rate, i.e., a flow rate that varies by less than 5% from a nominal flow rate. A suitable flow meter is a mass flow controller 62 (MFC), from Model No. 4400, 300 sccm nitrogen, MFC from STE, Koyoto, Japan. Another version of the controllable gas source 50 is a pressure-controlled MFC, such as an MFC rated at 3000 sccm from MKS Instruments, Andover, Mass. Other suitable flow meters can include MFCs from UNIT, Yuerba Linda, Calif. Suitable pressure regulators include a VARIFLO™ pressure regulator available from Veriflo, a division of Parker Hannifin Corporation, Cleveland, Ohio, or a pressure regulator from Swagelok, Solon, Ohio. A pressure display can also be used after the flow meter to read the pressure of gas applied to the apparatus.

In one embodiment, the gas nozzle measurement apparatus 20 comprises a sensor plate 66 which is sized to cover an area that includes at least a portion of the front face 32 of the gas plate 26. The sensor plate 66 has an array of gas flow sensors 68 arranged in locations that correspond to positions of individual gas nozzles 22 of the array of gas nozzles 24 in the gas plate 26. In one version, the sensor plate 66 comprises gas flow sensors 70 arranged in locations that correspond to positions of individual gas nozzles 22 of the gas plate 26 such that each gas flow sensor 70 can measure a pressure, flow rate, density, or velocity of a gas stream 38 passing through the individual gas nozzle 22 that faces the gas flow sensor 70. Thus, each gas flow sensor 70 is positioned on the sensor plate 66 to receive a gas stream 38 from a single individual gas nozzle 22 of the gas plate 26 and generate a signal indicative of, or display, the pressure, flow rate, density, or velocity of the gas stream 38 passing through the individual gas nozzle 22.

In one version, the sensor plate 66 is sized to cover an area comprising at least a portion of the front face 32 of the gas plate 26, and has gas flow sensors 70 mounted at positions corresponding to the locations of individual gas nozzles 22 along the plane of the gas plate 26. For example, the sensor plate 66 can have an array of gas flow sensors 68 which are spaced apart by the same distance, and along the same orientations, as the spacing distances between the gas nozzles 22 of the gas plate 26. For example, when the gas plate 26 comprises an array of concentric circles of gas nozzles 22, as shown in FIG. 3A, the sensor plate 66 also comprises an array of gas flow sensors 68 which are arranged in similar concentric circles. As one example, when the gas plate 26 has 2000 gas nozzles 22 arranged in concentric circles, the sensor plate 66 can also has 2000 gas flow sensors 70 arranged in identical concentric circles that each correspond to a position of one of the gas nozzles 22 of the gas plate 26, or a smaller number of sensors 70 that cover a portion of the area of the gas plate 26, for example, 200 sensors covering about 1/10 of the area of the gas plate 26. Alternatively, when the gas plate 26 comprises a rectangular or square array of gas nozzles 24, as shown in FIG. 3B, the sensor plate 66 comprises a corresponding or matching rectangular or square array of gas flow sensors 68. The gas sensor plate 66 can also be shaped and sized to have the same shape and size of the gas plate 26 being measured. In this example, a gas plate 26 having 5000 gas nozzles 22 which each have a center or central longitudinal axis that is spaced apart from the center or central longitudinal axis of an adjacent gas nozzle 22 by a spacing distance of from about 1 to about 10 mm, is measured using a sensor plate 66 having a corresponding number of sensors 70 spaced apart by the same spacing distance.

In these examples, the sensor plate 66 has the same shape as the gas plate 26, for example, the sensor plate 66 can be shaped as a circular plate having the same diameter as the gas plate 26. The gas flow sensors 70 are mounted at locations having a one-to-one correlation between the measurement taken by the gas flow sensor 70 and the particular gas nozzle 22 which is situated above the gas flow sensor 70 at the time of measurement. Also, advantageously, such a sensor plate 66 allows simultaneous measurement of the gas flow characteristics of all the gas nozzles 22 of the gas plate 26 at the same time.

In another version, the sensor plate 66 is sized smaller than the gas plate 26 and with a smaller number of sensors 70. In one version, such a sensor plate 66 comprises, for example, from about 100 to about 1000 sensors 70 mounted thereon, and can be used to measure or display the individual gas flow properties of a set of gas nozzles 22 of the gas plate 26 which has over 1000 gas nozzles 22. Advantageously, such a sensor plate 66 allows the gas flow sensors 70 to have diameters which are larger than the diameters 48 of the gas nozzles 22. This has a practical consideration, since the gas nozzles 22 are often sized much smaller than available gas flow sensors 70. In operation, each gas flow sensor 70 measures the gas flow properties of, for example, every second or fourth gas nozzle 22 of a set of gas nozzles on the gas plate 26 simultaneously. After a first set of measurements is made, or a display pattern on the sensor plate 66 is recorded, the sensor plate 66 is relocated by a fractional distance of the area of the gas plate 26 so that each sensor 70 can now measure or display the gas flow properties of another, adjacent, or alternate gas nozzle 22 in a second measurement sequence. In this manner, the sensor plate 66 can be gradually indexed or moved across the front surface of the gas plate 26 so that eventually the gas flow characteristics of each and every gas nozzle 22 on the gas plate 26 is measured by one of the gas flow sensors 70 on the sensor plate 66.

As one example, the sensor plate 66 comprises a shape corresponding to a quadrant 72 of the gas plate 26, such as, for example, a smaller rectangle when the gas plate 26 is a rectangle. The sensor plate 66 can also comprise a quadrant 72 such as a conical section of a gas plate 26 that is arcuate-shaped, circular or round. A sensor plate 66 that is square-shaped can also be used to cover a portion of the area of a square-shaped gas plate 26 and moved in increments such that a set of measurements or a recorded display is made to determine a property of each gas nozzle 22 of the gas plate 26. In one version, the sensor plate 66 is shaped to cover a quadrant of the gas plate 26. For example, a triangular sensor plate 66 can be pie-shaped comprising a triangle with a curved perimeter with spaced apart sensors 70 mounted over the plate 66, as shown in FIG. 3C. In this embodiment, the triangular sensor plate 66 is rotated about a fixed axis so that a sequence of measurements is made in which each gas flow sensor 70 of the sensor plate 66 at some time measures the properties of one of the gas nozzles 22. Rotating the triangular sensor plate 66 along fixed angular increments would allow measurement of all the gas nozzles 22 of the gas plate 26. The resultant set of measurements or display recordings is then coalesced into a single gas distribution pattern that provides measurements of the gas flow properties of each of the gas nozzles 22 of the gas plate 26.

In still another version, a longitudinal strip sensor plate 76, as shown in FIG. 3D, is gradually moved across the gas plate 26 by a robotic stage 78 to make measurements of longitudinal strips of overlying gas nozzles 22 at the same time. The longitudinal strip sensor plate 76 is raster scanned across the surface of the gas plate 26 with the longitudinal and lateral movements of the longitudinal strip sensor plate 76 controlled by the robotic stage 78 which has a motor and is preprogrammed to move the sensor plate 66 in a series of longitudinal and lateral movements such that at each measurement location the sensor plate 66 measures or displays the gas flow properties of an overlying and facing set of gas nozzles 22 of the gas plate 26. Again, the resultant set of gas nozzle measurement signals 95 is coalesced into a single array of measurements corresponding to each of the gas nozzles 22 of the gas plate 26.

The gas flow sensors 70 on the sensor plate 66 are used to determine the flow characteristics generated by the geometry, dimensions and nozzle surface characteristics of the gas nozzles 22 by monitoring the gas pressure, flow rate, density and velocity of a gas stream 38 passing through each of the gas nozzles 22. Each gas flow sensor 70 receives a gas stream 38 passing through an individual gas nozzle 22 and generates a display showing the same, or a set of gas nozzle measurement signals 95, each signal indicative of the pressure, flow rate, density, or velocity of the gas stream 38 passing through a particular individual gas nozzle 22 facing the gas flow sensor 70. The gas nozzle measurement display 101 or set of signals 95 is then correlated to particular gas nozzles 22 to identify the gas flow characteristics of that particular gas nozzle 22. In this manner, the sensor plate 66 of the gas flow measuring apparatus can be used to determine the flow characteristics of a plurality of gas nozzles 22 of the gas plate 26, or even all of the gas nozzles 22, in a single recorded display or plurality of recorded displays, or a measurement or set of measurements.

The gas flow sensors 70 of the sensor plate 66 are used to measure or display the gas flow characteristics, such as pressure or gas flow rate, of the gas streams 38 emanating from individual gas nozzles 22. The gas flow sensors 70 can be, for example, acoustic, chemical, capacitive, electrical, electromechanical, liquid-based, magnetic, mechanical, piezoelectric, resistive, thermal, vibration-based, and other types of sensors. Particular illustrative examples of such gas flow sensors will now be described to illustrate the present invention; however, it should be understood that the present invention is not limited in scope to these illustrative embodiments and can include other types of gas flow sensors 70 as would be apparent to those of ordinary skill in the art.

In one embodiment, the gas flow sensors 70 comprise electrical sensors, such as piezoelectric sensors. In one example, the electrical sensors comprise, for example, piezoresistive pressure sensors 80. In one version, the piezoresistive pressure sensors 80 are capable of detecting the pressure of an impinging gas stream 38 from a gas nozzle 22, for example, as illustrated in FIG. 4A. An exemplary piezoresistive pressure sensor 80 comprising a silicon member having a plurality of electrical resistors 82 formed thereon is shown in FIG. 4B. The silicon member can be shaped as a rectangular silicon membrane 84 (as shown) or a beam (not shown), and is supported by opposing supports 86 located under opposing ends of the member, as shown in FIG. 4C. The silicon membrane 84 flexes and deforms under the force applied by a gas stream 38 emanating from a gas nozzle 22 about the opposing supports 86, as shown in FIG. 4A. The opposing supports 86 are bonded to a plate 88 which is typically made of glass or silicon. When the silicon membrane 84 flexes, it induces a strain in the resistors 82 causing the resistors 82 to deform and thereby change their electrical resistance. As a result, the resistive path of one or more of the resistors 82 are lengthened and narrowed, thereby increasing their resistance, while the resistive paths of other resistors 82 are shortened and widened, thereby decreasing their resistance. A current passed through the resistors 82 on the membrane 84 changes by an amount corresponding to the changed resistance of the resistor 82 to generate a gas nozzle measurement signal 95 comprising a change in voltage 90 that is related to the pressure of the impinging gas stream 38, as shown in FIG. 4A.

The version of a piezoresistive pressure sensor 80 shown has four resistors 82, including upper and lower resistors 82 having resistances R1 and R2, respectively, which are substantially aligned to one another so that their individual resistances increase with flexure of the silicon membrane 84. The left and right resistors 82 having resistances R3 and R4, respectively, are also substantially aligned to one another so that their resistances decrease under flexure of the silicon membrane 84. When connected to a voltage 90 and arranged in a Wheatstone bridge configuration, as shown in FIG. 4B, the changes in resistance of the resistors 82 produce an output voltage, $V_{out}$, which is given by the difference in the ratios of the resistances R1/R3 and R4/R2. The piezoresistive pressure sensor 80 is calibrated so that at zero deflection of the silicon membrane 84, the ratios are equal, which yields a $V_{out}=0$. Under strain, R1 increases while R3 decreases, driving the ratio R1/R3 up, while R2 increases and R4 decreases, driving the ratio of R4/R2 down. The difference in these ratios results in an output voltage, $V_{out}$, which can be translated into a gas nozzle measurement signal 95 to measure of the gas pressure of the gas stream 38 passing through a particular gas nozzle 22 of the gas plate 26. A suitable piezoresistive pressure sensor 80 comprises an SMD series sensor fabricated by Merit Sensor, South Jordan, Utah. Such piezoresistive pressure sensors 80 operate in a temperature range of from about −40° C. to about 150° C. These piezoresistive pressure sensors 80 also provide a change in impedance of from about 4000 ohms to about 6000 ohms in response to an applied pressure by the gas streams 38 emanating from the gas nozzles 22 of from about 34.5 kPa to about 3447 kPa.

A signal processor 92, as shown in FIG. 1A, can be used to index, evaluate, generate and display, as a table or in graphical form, a visual display signal or a set of gas flow measurements signals of the measured pressure, flow rate, density or velocity of the gas stream 38 passing through each individual gas nozzle 22 of a gas plate 26 being measured by the sensor plate 66. The signal processor 92 comprises electronic circuitry that includes integrated circuits suitable for operating the gas nozzle measurement apparatus 20, peripheral data input and output devices, and other related components. Generally, the signal processor 92 is adapted to accept data input, run algorithms, produce useful output signals, detect data signals from the detectors and other chamber components, and to monitor or control the gas nozzle measurement apparatus 20. In another example, the signal processor 92 may comprise a computer comprising (i) a central processing unit (CPU) (e.g., conventional microprocessors from INTEL or AMD corporation) that is coupled to a memory that includes a removable storage medium (e.g., a CD or floppy drive) and/or a non-removable storage medium (e.g., a hard drive or ROM, and RAM); (ii) application specific integrated circuits (ASICs) that are designed and preprogrammed for particular tasks, such as retrieval of data and other information from the components of the gas nozzle measurement apparatus 20, or for operation of particular components; and (iii) interface boards that are used in specific signal processing tasks, comprising, for example, analog and digital input and output boards, communication interface boards and motor controller boards. The controller interface boards can, for example, process measurement signals from a plurality of gas flow sensors 70 and provide corresponding data signals to the CPU. The computer also has support circuitry that include, for example, co-processors, clock circuits, cache, power supplies and other well known components that are in communication with the CPU. The RAM can be used to store one or more computer programs, or instructions sets of code, used to operate the gas nozzle measurement apparatus 20 for process implementation. The user interface between an operator and the signal processor 92 can be, for example, via a conventional display, and a data input device, such as a keyboard or light pen, can also be provided. To select a particular screen or function, the operator enters the selection using the data input device and can review the selection on the display. While an illustrative embodiment of the signal processor 92 is described as a single computer, it should be understood that the signal processor 92 can be a set of separate microprocessors that each comprise programmable integrated circuits with the desired instruction sets of code embedded in the circuits.

In one embodiment, the signal processor 92 comprises a computer program which is readable by the computer or the set of microprocessors and may be stored in the memory, for example, on the non-removable storage medium or on the removable storage medium. The computer program can be a single program code set or a set of different program code which is operated on the different microprocessors. The programs comprise instruction sets of code which are typically stored in storage mediums and are recalled for temporary storage in RAM when being executed by the CPU. The computer program generally comprises measurement and control software comprising program code comprising instructions to operate the gas nozzle measurement apparatus 20 and its components, and process monitoring software to monitor the gas flow processes being performed in the apparatus, safety systems software, and other control software. The computer program may be written in any conventional programming language, such as, for example, assembly language, C++, Pascal, or Fortran. Suitable program code is entered into a single file or multiple files using a conventional text editor and stored or embodied in computer-usable medium of the memory. If the entered code text is in a high level language, the code is compiled, and the resultant compiler code is then linked with an object code of pre-compiled library routines. To execute the linked, compiled object code, the user invokes the object code, causing the CPU to read and execute the code to perform the tasks identified in the program.

In one version, the signal processor 92 comprises electronics and program code that operates as an indexing sensor 98 which determines the position of each gas flow sensor 70 in relation to each gas nozzle 22 and generates a plurality of gas nozzle position index signals 96 that each identify a particular gas flow sensor 70 used to measure a particular gas nozzle 22. The indexing sensor 98 can be a programmable microprocessor which is connected to a robotic stage 78 that supports the sensor plate 66. The robotic stage 78 comprises a motor and suitable gear assembly to drive the stage incremental distances along the X and Y coordinates along a plane parallel to the plane of the gas plate 26. The indexing sensor 98 and robotic stage 78 are programmed to move the sensor plate 66 in incremental spatial distances across the surface of the gas plate 26 such that each gas flow sensor 70 of the sensor plate 66 can measure a gas flow property of a gas nozzle 22 of the gas plate 26. At the time of measurement, the indexing sensor 98 retains a table of X,Y coordinate information for each of the gas flow sensors 70 of the gas plate 26, and the corresponding X, Y coordinate information for each of the gas nozzles 22 of the gas plate 26. The indexing sensor 98, when requested, passes to the signal processor 92 a table of the gas nozzle measurements taken by a particular gas sensor and related gas nozzle position index signal 96 for each gas nozzle 22 from which the measurements were obtained.

The signal processor 92 also includes a signal receiver 100 to receive a plurality of gas nozzle measurement signals 95 from a display image or as separate electrical signals, and corresponding gas nozzle position index signals 96, and correlate each gas nozzle measurement signal 95 with a gas nozzle position index signal 96. The signal receiver 100 than processes, or otherwise evaluates the gas nozzle measurement signals 95 and outputs data displaying the gas pressure, flow rate, density, or velocity of the gas stream 38 passing through each gas nozzle 22. The signal receiver 100 can also generate a table of measurements of this data or show the same in a graphical display of the gas pressures, flow rates, or velocities of the gas streams 38 passing through each gas nozzle 22 using the gas nozzle measurement signal 95 and gas nozzle position index signal 96 for each gas nozzle 22

Before running a gas nozzle measurement sequence using a particular sensor plate 66, the gas flow sensors 70 on the sensor plate 66 are initially calibrated using calibration tests which inject a gas stream 38 having a predetermined flow, pressure, density, or velocity of gas to the sensing surface of the gas flow sensors 70. Alternatively, the gas flow sensors 70 can be calibrated by applying a gas stream 38 having a set pressure, flow rate, density, or velocity to the sensing surface of the sensor 70. Once calibrated, the calibrated sensors 70 can be used to display or measure the properties of the gas plates 26.

In operation, the controllable gas source 50 is used to provide a constant flow rate of gas, or a constant pressure of gas, to the inlet of the gas tube 102 of the gas nozzle measurement apparatus 20. In one version, a pressure regulator is set to provide gas at a constant pressure of, for example, from about 10 to about 10,000 kPa, or even from about 30 kPa to about 3000 kPa. For measuring the flow properties of about 1000 gas nozzles 22 that each have a minimum diameter of 100 microns, the flow meter can be set to provide a flow rate of from about 10 to about 1000 sccm. However, the set gas flow rate, or gas pressure, is much larger when a larger number of nozzles are being measured, for example, for 3000 gas nozzles 22, for which the flow rate can be set to a level from about 10 slm to about 1000 slm.

The gas sensors 70 on the sensor plate 66 are calibrated and/or zeroed out at the beginning of each measurement sequence. Gas at a constant flow rate or constant pressure is supplied to an inlet 112 of a housing 114 which holds the gas plate 26 in place and also provides a seal around the edge of the gas plate 26. A sensor plate 66 is positioned by a robotic stage (or manually) to cover at least a portion of the front face 32 of the gas plate 26, the sensor plate 66 comprising an array of gas flow sensors 68 arranged in locations that correspond to positions of individual gas nozzles 22 of the array of gas nozzles 24 in the gas plate 26. The gas provided to the housing 114 flows through the gas nozzles 22 of the gas plate 26 to form a plurality of gas streams 38 which are directed onto a plurality of gas flow sensors 70 on a sensor plate 66, as shown in FIG. 1A. Each gas sensor 70 or array of gas sensors 68 displays or measures and generates an electrical or other signal indicative of the pressure, flow rate, density, or velocity of the impinging gas stream 38 that emanates from a single nozzle 22, such that a plurality of the gas sensors 70 simultaneously measure the gas flow characteristics of impinging gas streams 38 from an equivalent plurality of gas nozzles 22. The gas flow sensors 70 generate a display indicative of a plurality of gas nozzle measurement signals 95, each of which is indicative of the pressure, flow rate, density, or velocity of a gas stream 38 passing through an individual gas nozzle 22 which faces a gas flow sensor 70.

The signal receiver 100 of the signal processor 92 receives the set of gas nozzle measurement signals 95 when a signal receiver 100 is used. An indexing sensor 98 of the signal processor 92 determines the position of each gas flow sensor 70 in relation to each gas nozzle 22 and generates a display of, or a plurality of, gas nozzle position index signals 96 that each identify a visual or electrical signal from a particular gas flow sensor 70 which is used to measure a gas flow or pressure property of a particular gas nozzle 22. The signal receiver 100 also receives the gas nozzle position index signals 96 for each gas nozzle 22 and then correlates the display or the gas nozzle position index signals 96 with the gas nozzle measurement signals 95 so that each point on the display or each gas nozzle measurement signal 95 is associated with a particular gas nozzle 22 of the gas plate 26. A display 101, such as a printout, CRT or flat panel screen, can then be used to display the gas pressure, flow rate, density, or velocity of the gas stream 38 passing through each gas nozzle 22 using the gas nozzle measurement signal 95 and gas nozzle position index signal 96 for each gas nozzle 22.

The recorded or visual display 101 or set of signals 95 of the measured pressure, flow rate, density, or velocity characteristics of the gas nozzles 22 is also indicative of other properties of the gas nozzles 22. For example, it was further discovered that the surface roughness of the internal sidewall 118 surfaces of the gas nozzles 22 can affect the pressure and flow rate of the gas passing through the hole 44 of the gas nozzle 22 (as shown, for example, in FIG. 2A-D). When the gas plate 26 is being fabricated, the machining tool used to form the holes 44 of the gas nozzles 22 can gradually wear out over time, resulting in some gas nozzles 22 having sidewalls 118 with rougher surfaces and with more defects than the nozzles 22 which were initially machined by a fresh tool. This affects the processing results obtained when the resultant gas plate 26 is used in a substrate processing chamber 120 comprising a substrate 122 (as shown in FIG. 1B). For example, when a gas plate 26 having some gas nozzles 22 with rough surfaces is used in a CVD process, the gas nozzles 22 with the rougher sidewalls 118 can result in the deposition of a slightly thinner layer on the portion of the substrate 122 facing the central portion of such a gas nozzle 22, and a thicker deposition annulus facing the circumference of the same gas nozzle 22. Further, when material is being etched from the substrate 122 using etchant gas emitted from gas nozzles 22 having rough or poorly machined uneven surfaces, the portion of the substrate 122 facing the center of the gas nozzle 22 is etched faster than the portions of the substrate 122 facing the circumference of the gas nozzle 22. It is believed that these results occur because the velocity of gas about the central portion of the "rougher" gas nozzle 22 is faster than the velocity of gas along the circumferential sidewalls 118 of the nozzle 22, which in turn results from the non-laminar flow of gas molecules adjacent to the rough sidewalls 118 as compared to the more laminar flow of gas at the center of the gas nozzle 22.

Thus, in addition to the diameter 48 of the gas nozzle 22, the surface smoothness or roughness of the sidewall 118 surfaces of the gas nozzles 22 also affect the properties of the layer being processed on the substrate 122. However, conventional techniques to measure the surface roughness of the surface are difficult to implement on the surfaces within and inside the holes 44 of the gas nozzles 22. For example, conventional surface roughness methods can be made using a profilometer which runs a needle probe across a surface to measure its surface roughness. However, it is difficult to access the inside of a gas nozzle 22 with such a probe without cutting or opening the nozzle 22; furthermore, the distance of the nozzle 22 is relatively short and does not allow an accurate surface roughness measurement profile.

The present gas measurement techniques are useful in such applications, namely, visually displaying to an operator, recording a display, or providing a set of measurements of the internal surface characteristics of the gas nozzles 22, nondestructively, and allowing the simultaneous display or measurement of the properties of a large number of gas nozzles 22. The display or measurements can be qualitative or quantitative in nature, and can also be made by calibrating a set of gas nozzles 22 for a constant flow or pressure of supplied gas, and relating the surface properties of these gas nozzles 22 to a measured gas pressure, flow rate, density, or velocity of the gas stream 38 passed through these gas nozzles 22 and onto the gas flow sensors 70 and sensor plate 66. The resultant gas pressure and flow characteristics of the set of calibrated gas nozzles 22 are then compared with displays or measurements made on actual production gas nozzles 22 to derive or evaluate the surface characteristics of the production gas nozzles 22.

It was further discovered that still another problem arises because of the plastic deformation and resultant smearing of the grains of the material which make up the internal sidewall 118 surface of the gas nozzles 22. For example, when the gas plate 26 is made from metallic materials, the metal material is plastically deformed with the high shear stresses applied across the grains by the mechanical tool bits used to drill holes in these metal parts. Depending on the degree of wear of the drilling tool bits, the varying shearing force at the surfaces of the gas nozzles 22 cause variations in the structure of amount of deformation of the smeared surface grains which further contribute to variations in the smoothness of the internal sidewall 118 surfaces of the gas nozzles 22.

The grain smearing problem can be reduced by selecting the RPM range at which the mechanical tool that is operated to optimize the rotational cutting speed for the particular material being grilled. Selection of the correct RPM speed for the drill bit reduces the amount of smearing of the surface grains. The selected or ideal RPM range depends on the properties of the materials from which the gas plate 26 is made. For example, smooth sidewall 118 surfaces can be produced in gas nozzles 22 drilled into metals such as stainless steel using a drilling tool bit operated at RPM's exceeding 50,000 rpm, or even RPM's of from about 60,000 to about 80,000 rpm. At these rotational speeds, the drilling tool bits generate smooth surfaces and less smearing across the sidewalls 118 of the gas nozzles 22. However, conventional machining methods, such as Robodrill, use RPM's in the range of 25,000 rpm, which results in a rough internal surface of the gas nozzles 22, excessive smearing, and more variability in surface properties from one gas nozzle 22 to another. Thus, selection of the correct RPM speed for the drill bit reduces the amount of smearing of the surface grains. The gas flow measuring apparatus 20 can be used to correlate the RPM speed use to drill particular gas nozzles 22 to the flow properties of gas passed through the gas nozzles 22. For example, the RPM speed for drill bit can be related, with suitable calibration gas nozzles 22, to the gas pressure, flow rate, density, or velocity of the gas stream 38 passed through the gas nozzles 22 and measured by the gas flow sensors 70 on a sensor plate 66.

Still further, suitable drill bit moving patterns can be established to move the drill tool bit around a particular gas plate 26 so that when the bit is worn out, it is used to drill gas nozzles 22 which are relatively unimportant compared to other gas nozzles 22 as determined from the ideal, empirically determined, gas plate 26 profile. Also, the tool bit could be moved around to make good use of the effect of the wear and tear of the tool bit tip on the dimensions of the gas nozzles 22. Again, a recorded display or measurements taken by the gas flow measuring apparatus 20 can be used to correlate drill bit moving patterns to the flow properties of gas passed through the gas nozzles 22 drilled using a particular drill bit moving pattern. In addition, optimal drill tool bit moving patterns can be selected using empirical results of the gas pressure, flow rate, density, or velocity distribution across all of the gas nozzles 22 of different gas plated 26.

In still another method, the gas nozzle measurement apparatus 20 is used to measure an ideal or "golden" gas flow distribution pattern provided by an ideal or golden gas plate 26. The golden pattern is then compared to test patterns obtained for production gas plates 26 to identify the gas plated 26 which have similar patterns, and consequently, similar shapes, dimensions or internal surface characteristics of the gas nozzles 22 on these gas plated 26. In one version, the ideal gas plate 26 is selected empirically by processing substrates 122 with different gas plates 26 and selecting a particular gas plate 26 that provides a recorded display or set of measurements of an optimal processing pattern across a test substrate 122. The optimal processing pattern across a test substrate 122 can be determined from properties of the layer being processed on the substrate 122 (which can be a deposited or etched layer) by measuring the properties of this processed layer, using reflective, thickness, ellipsometric, or surface resistance properties, and others. The ideal gas plate 26 is then tested in the gas nozzle measurement apparatus 20, and the gas flow pattern for the ideal gas plate 26 is used as a golden pattern. When production gas plates 26 are then tested, the test patterns produced by the production gas plates 26 are compared to the golden pattern, and those gas plates 26 that provide substantially similar patterns—for example, patterns that differ by less than ±5%—are selected, whereas others are used for other process applications.

The above techniques can also be used to classify measured gas plates 26 into different tolerance categories. For example, the tolerances allowed for a gas plate 26 can also vary from one type of substrate process to another type of process. For example, in one embodiment, the thickness of a layer deposited by a chemical vapor deposition (CVD) process that uses a production gas plate 26 should optimally vary by less than ±3% across the test substrate 122. Such a CVD process requires a gas plate 26 having a tight tolerance for all the gas nozzles 22 on the gas plate 26. However, in a different CVD process, this variation can be a three sigma standard deviation value of ±5%, which is a low tolerance for the gas nozzles 22. Accordingly, a particular production gas plate 26 may be suitable for the second CVD process but not the first CVD process. Suitable gas plates 26 for each of the CVD processes are selected using the test patterns for the gas nozzles 22 of the gas plates 26 as measured by the gas nozzle measurement apparatus 20. As another example, a predetermined tolerance level for a gas plate 26 can be used for a particular gas deposition or etching process. For example, processes for the deposition of silicon dioxide using silane are highly sensitive to the dimensions and surface properties of the gas nozzles 22 in the gas plate 26 used to distribute the silane in the processing chamber 120. Thus, the gas plates 26 selected for such silicon dioxide/silane deposition processes should have a tight tolerance of gas nozzles 22.

It should be further noted that the ideal gas flow pattern produced by a gas plate 26 is not always a smooth or flat distribution across the gas plate 26. For example, in certain etching processes, it may be more desirable to have gas nozzles 22 with slightly larger holes 44 at the central region of the gas plate 26, and gas nozzles 22 with slightly smaller holes 44 at the peripheral edges of the gas plate 26. In such an example, in the actual etching processes, it is hotter at the peripheral edges of the substrate support 123 than at the central portion of the support 123, and thus, it is desirable to have lower gas flow rates emanating from the gas nozzles 22 at the peripheral edge of the gas plate 26 than those at the central portion.

The gas flow pattern of the gas plate 26 displayed or measured by the gas nozzle measurement apparatus 20 has still other applications. For example, after the gas nozzle display recordings or measurements are made for a particular gas plate 26, selected gas nozzles 22 in the gas plate 26 can be re-drilled while the gas plate 26 is still on the fixture of the nozzle drilling machine to adjust the dimensions (or surface properties) of these selected gas nozzles 22. Alternatively, gas nozzles 22 which are too large can be made smaller by inserting a hollow cylindrical insert into these gas nozzles 22.

Alternative embodiments of the gas nozzle measurement apparatus 20 can also be used to measure the pattern of the gas flow characteristics of the gas nozzles 22 of a gas plate 26. In another version, the gas nozzle measurement apparatus 20 comprises a laser Doppler interference measuring apparatus 128 comprising a seed particle injector 130, a laser Doppler interferometer 132, a plurality of electro-optical detectors 134, and a signal processor 92, as shown in FIGS. 5A and 5B. In this version, the seed particle injector 130 disperses seed particles 138 into a flow of gas passed to the back surface of the gas plate 26. The seed particle injector 130 can be, for example, a fluidized bed aerosol generator or atomizer. The seed particles 138 are selected to have appropriate mass and size so as to be entrained into the flow at the local gas flow velocity so that measurement of seed particle 138 velocity is equivalent to measurement of the local gas flow velocity. The seed particles 138 are also sufficiently reflective to reflect the laser beam 140 incident on these particles. The particles 138 follow changes in the local gas flow velocity sufficiently quickly as to allow measurement of the changes in seed particle 138 velocity, which are equivalent to measurements of changes in the local gas flow velocity, to provide a display or measurements of the gas flow rate, density, velocity or pressure of the gas stream 38 passing through each gas nozzle 22. The seed particle injector 130 may comprise a source of seed particles 138 comprising, for example, aluminum oxide particles, titanium oxide particles, polystyrene spheres, metallic-coated glass spheres, hollow-glass spheres, or metallic-coated hollow-glass spheres. In one example, the particles 138 are sized from about 1 micron to about 100 microns.

The laser Doppler interferometer 132 illuminates the gas streams 38 passing through the gas nozzles 22 of the gas plate 26 with a plurality of laser beams 140 of coherent light to create interference fringes 133 in an illuminated region, as shown in FIG. 5A-B. The laser beams 140 are provided at one or more frequencies such that beams interfere with one another in the illuminated region to produce interference fringes 133 which serve as a display of the gas flow rate, density, velocity or pressure of the gas stream 38 passing through each gas nozzle 22. Several beams 140 are produced from one or more single laser sources by, for example, a beam splitter 142 or an acousto-optical modulator (AOM) 144. The frequency of the beams 140 are shifted by a fixed known frequency through the use of the AOM 144. The beams 140 illuminate the gas streams 38 from the gas nozzles 22, causing the seed particles 138 entrained in the gas streams 38 to scatter light and thereby exhibit a Doppler shift in frequency corresponding to the magnitude of a component of the velocity of the seed particles 138 in the gas stream 38.

The plurality of electro-optical detectors 134 operate as gas sensors 70 to detect the intensity as a function of time of scattered light from the gas streams 38 illuminated by the laser Doppler interferometer 132, and generate a plurality of gas nozzle measurement signals 95 corresponding to the measured intensity of the scattered light to provide a display or set of measurements of the gas flow rate, density, velocity or pressure of the gas stream 38 passing through each gas nozzle 22. The electro-optical detector 134 is chosen to have a bandwidth larger than the Doppler frequency shifts of seed particles 138 in the gas streams 38. The electro-optical detector 134 can be, for example, one or more photodiodes connected to amplifiers and filters with output leads to the signal processor 92.

The signal processor 92, as described above, is connected to the electro-optical detector 134 and receives the plurality of gas nozzle measurement signals 95 from the electro-optical detector 134, each of which represents the intensity as a function of time of scattered light from the gas streams 38 emanating from the gas nozzles 22 of the gas plate 26. The signal processor 92 also determines the position of each electro-optical detector 134 in relation to each gas nozzle 22 and generates a plurality of gas nozzle position index signals 96, each gas nozzle position index signal 96 identifying the particular electro-optical detector 134 used to measure a particular gas nozzle 22. The signal processor 92 further correlates the plurality of gas nozzle measurement signals 95 with the plurality of gas nozzle position index signals 96 and outputs data displaying the gas pressure, flow rate, density, or velocity of the gas stream 38 passing through each gas nozzle 22. For example, the signal processor 92 can perform a Fourier transform on the gas nozzle measurement signal 95 received from the electro-optical detector 134, the peaks of which correspond to a component of seed particle 138 velocity, as shown in FIG. 5C-D. The signal processor 92 also receives and generates signals for controlling any one or more of the seed particle injector 130, laser Doppler interferometer 132, the electrical-optical detector 134, and any robotic stage 78 used to control movement of the gas plate 26 being measured. For example, the signal processor 92 can generate seed particle injector 130 signals to control the injection time, duration and volume of seed particles 138 injected into the gas flow passed to the back face 30 of the gas plate 26. The signal processor 92 can also control the lasers 136 or laser beams 140 to set the intensity and gas stream 38 location illuminated by the laser Doppler interferometer 132, as well as the frequency and power of any AOM's 144. The signal processor 92 can include a number of electronic interfaces for controlling each of these devices and suitable program code programmed into these electronic interfaces.

In operation, the laser Doppler interference measuring apparatus 128 measures the velocity of the micron-sized seed particles 138 which are entrained in the gas streams 38 passed through the gas nozzles 22 of a gas plate 26 to allow measurement of the velocity of the gas stream 38 passing through a gas nozzle 22 of a gas plate 26. The scattered light from a moving seed particle 138 exhibits a shift in frequency proportional to the component of velocity of the seed particle 138 along the direction of the laser beam 140. This shift in frequency, known as the Doppler shift, is detected by interfering the scattered light with a portion of the original illuminating laser beam 140. This can be done by beam splitting the illuminating laser beam 140 and passing the split beam components either directly to the electro-optical detector 134 or to the illuminated portion of the gas streams 38 at a different angle to the illuminating beam 140. Interference of the two beam patterns generates a series of bright and dark bands, known as interference fringes, that move across the electro-optical detector 134 at a speed proportional to the Doppler shift. The intensity of the light falling on the electronic and optical detector is plotted as a function of time to determine a velocity component of a seed particle 138 passing across the laser beam 140 in the gas stream 38. In one method, this is done by Fourier-transforming the intensity signal generated by the electron-optical detector 134 and locating a peak in frequency space which corresponds to the magnitude of the velocity component of the seed particle 138 to provide a display of the gas flow rate, density, velocity or pressure of the gas stream 38 passing through each gas nozzle 22.

In another operational version, the split laser beam 140 is passed through a Bragg cell, or acousto-optical modulator (AOM) 144, to introduce a fixed, known frequency shift in the laser beam 140. This shift moves the zero-velocity peak in frequency space off of zero-frequency shift to allow both the magnitude and direction of the seed particle 138 in the gas stream 38 to be measured. This technique allows greater resolution of velocities near zero, as there is higher signal to noise than at zero frequency.

In still another version, all three components of the velocity of the seed particle 138 in the gas stream 38 are measured. In this version, the gas streams 38 are illuminated by lasers 136 at different angles which are chosen to allow management of all three velocity components of the seed particles 138 traveling in the gas stream 38. The electro-optical detector 134 receives scattered light and resolves these signals to provide a display of the gas flow rate, density, velocity or pressure of the gas stream 38 passing through each gas nozzle 22. In this version, the lasers 136 are typically frequency shifted so that the signals may be resolved through the use of simple filters. The frequency shift of the laser 136 is accomplished using the Bragg cell or AOM 144 which is also able to generate each frequency-shifted signal as a different beam 140 emerging at a different angle from a single laser 136. In this way, a single laser 136 may be used with an AOM 144 to generate each necessary beam 140 for three-component velocity measurement with the necessary frequency shifts so that the resultant signals could be collected and resolved by a single detector 134.

In still another method, the gas nozzle measurement apparatus 20 comprises a seed particle injector 130 to uniformly inject magnetic particles 146 (shown in FIG. 6) across the back face 30 of a gas plate 26 and into the flow of gas. Individual streams of magnetic particles 146 pass through each of the gas nozzles 22 of the gas plate 26. In this version, a sensor plate 66 comprising a metal plate 148 is placed abutting, or at a fixed spacing distance, from the front surface of the gas plate 26 to receive the magnetic particles 146. The magnetic particles 146 stream through the various gas nozzles 22 and impinge on the sensor plate 66 to form a distribution of magnetic particles 146 adhered to the sensor plate 66 which reflects the gas flow characteristics of each of the gas nozzles 22. The sensor plate 66 can be removed with particles 146 on it and analyzed to determine the gas flow or pressure distribution for each of the gas nozzles 22 of the gas plate 26 being tested. The magnetic particle distribution on the plate 26 can, for example, include a circle of magnetic particles 146 facing each gas nozzle 22 which has a diameter sized in relation to the diameter 48 of the gas nozzle 22, and in some cases, sized approximately the same as that of the gas nozzle 22. The magnetic particle distribution indicates whether the gas flow from the gas nozzles 22 is optimal or less than optimal according to the shape and thickness of the metallic particles 146 facing each gas nozzle 22. For example, a magnetic particle distribution comprising small and large circles of magnetic particles 146 can indicate gas nozzles 22 having smaller and larger holes 44, respectively; gas nozzles 22 having smoother and rougher surfaces; or a distribution of gas nozzles 22 having varying surface flow characteristics. An electrically produced magnetic field 150 can also be used to control the distribution of magnetic particles 146 impinging on the sensor plate 66 to provide a display of the gas flow rate, density, velocity or pressure of the gas stream 38 passing through each gas nozzle 22. The sensor plate 66 can also be magnetic, such as being powered by an electromagnet or a permanent magnet.

In another embodiment, the gas nozzle measurement apparatus 20 comprises a sensor plate 66 which is a thermal sensing wafer 152. The thermal sensing wafer 152 converts to the pressure, flow rate, density, or velocity of the gas streams 38 impinging on the thermal sensing wafer 152 into thermal information, such as a temperature distribution. For example, the gas nozzle measurement apparatus 20 can comprise a heater to uniformly preheat the thermal sensing wafer 152 to a temperature of from about 30° C. to about 100° C., prior to measurement. A gas having a controlled temperature is supplied to the gas distribution faceplate 36, and gas flowing from the nozzles 22 impacts and transfers heat from the heated thermal sensing wafer 152. The temperature profile of the thermal sensing wafer 152 can be mapped using temperature sensors 153 that are connected to the thermal sensing wafer 152, or optically by measuring the infrared spectrum across the wafer surface. For example, an infrared camera 154 can be used to capture the image of the thermal infrared pattern generated across the thermal sensing wafer 152, as shown in FIG. 7A-B. The signal processor 92 then analyzes the mapped temperature profile or captured image of the temperature distribution and correlates the temperature variation to the gas flow rate, density, velocity or pressure of the gas stream 38 passing through each gas nozzle 22.

In yet another embodiment, the gas nozzle measurement apparatus 20 comprises a sensor plate 66 comprising one or more thermochromic liquid crystal (TLC) plates 156, as shown in FIG. 8A-B. Each TLC plate 156 comprises thermochromic liquid crystals 158 which are capable of changing the color of reflected light based on the temperature of the thermochromic liquid crystals. Thermochromic liquid crystals 158 selectively reflect different wavelengths of light at different temperatures—from red light 159 to blue light 155—due to the difference in spacing 161 between the liquid crystal layers 163. Thus, thermochromic liquid crystals 158 exposed to white light 157 appear to change color as they change temperature to provide a display of the gas flow rate, density, velocity or pressure of the gas stream 38 passing through each gas nozzle 22. Thermochromic liquid crystals 158 can comprise either encapsulated liquid crystals, in which the liquid crystal material is contained within small spheres, typically measuring 5-10 micron, in a suspension or unencapsulated liquid crystal material in which the liquid crystal material is in its natural form. A particular thermochromic liquid crystal composition exhibits color change only over a range of temperatures, known as its temperature bandwidth. When viewed in white light 157, thermochromic liquid crystals 158 change from red to blue over their temperature bandwidth and are black at temperatures not within the temperature bandwidth. The temperature bandwidth of a thermochromic liquid crystal 158 may range from about 0.1° C. to about 30° C. A TLC plate 156 may comprise a mixture of thermochromic liquid crystals 158 having different temperature bandwidths, which allows for an effective temperature sensing range beyond the temperature bandwidth of any single thermochromic liquid crystal 158 species in the mixture. A camera captures the image of the color pattern of the TLC plate 156, which corresponds to a temperature distribution. The signal processor 92 then analyzes the captured image of the color pattern and correlates the temperature variation to the gas flow rate, density, velocity or pressure of the gas stream 38 passing through each gas nozzle 22.

In another embodiment, the gas nozzle measurement apparatus 20 comprises a sensor plate 66 comprising a substrate coated with a uniform coat of pressure-sensitive paint 160, as shown in FIG. 9. The pressure-sensitive paint 160 generates an image display which shows the changes in property of the paint with application of pressure from a gas stream 38 from a gas nozzle 22 of the gas plate 26. For example, the pressure-sensitive paint 160 can show a display in which the color of a point on the display corresponding to the location of a gas nozzle 22 changes as a function of the impinging gas flow rate or pressure of the gas stream 38 emanating from a particular gas nozzle 22. The pressure-sensitive paint 160 generally consists of luminescent molecules in a special binder which is permeable to oxygen. Pressure-sensitive paints such as Unicoat and UniFTB are available from Innovative Scientific Solutions, Inc., Dayton, Ohio. It can be desirable to use a pressure-sensitive paint 160 that is easy to apply in a uniform thickness and which does not require a multiple-coat application. A camera captures the image of the pressure-sensitive paint 160. The signal processor 92 then analyzes the captured image and correlates the color variation, or other physical property, to the gas flow rate, density, velocity or pressure of the gas stream 38 passing through each gas nozzle 22.

In still another embodiment, the gas flow sensors 70 of the gas flow measurement apparatus comprises a plurality of microtube sensors 162 which are each capable of sensing a pressure, flow rate, density, or velocity of an impinging gas stream 38 from a gas nozzle 22 of a gas plate 26. An embodiment of a microtube sensor is described in U.S. Pat. No. 6,647,778, published Nov. 18, 2003 to Douglas Sparks, which is incorporated herein by reference in its entirety. An exemplary microtube sensor 162 comprises a substrate such as a silicon substrate with one or more microtubes supported thereon. The tubes can be micromachined from materials such as silicon, other semiconductor material, quartz, ceramic, metal or composite material, and can be fabricated from layers of the chosen materials, or by etching the substrate. During operation, the tubes serve as a conduit through which a fluid flows while the tube is vibrated. Properties of the fluid can be ascertained from the behavior of the vibrated tube, for example, the twisting of the tube can be correlated to the mass flow rate of the fluid flowing through the tube, while the vibration frequency of the tube can be correlated to the density of the fluid. The tube 162 can be sized with a length of about 0.5 mm and a cross-sectional area of about 250 $\mu m^2$, though smaller and larger sizes are also possible. Electrodes 164 are provided in the microtube sensor 162 to provide a frequency of vibration to the microtube and to sense the motion of the microtube, such as the microtube's vibration frequency, proximity of the tube or other motion characteristics (as shown, for example, in FIG. 10B). Alternatively, the microtube sensor 162 can be configured to measure a pressure. The microtube is fabricated such that one of the walls of the microtube is able to flex in response to a change in pressure within the tube. Electrode sensors 164 are arranged proximate to the flexible wall to sense the proximity of the flexible wall portion. In an exemplary embodiment, the sensors 164 measure the position or motion of the microtube capacitively. The measured position or motion characteristics can be provided to a signal receiver 100 of a signal processor 92, and processed to convert the signal into a measured mass flow, density, velocity or pressure for display, as shown in FIG. 10A.

Suitable microtube sensors 162 are available from Integrated Sensing Systems, Ypsilanti, Mich. The microtube sensors 162 can be provided on a sensor plate 66 much like the gas flow sensor 70 configurations of FIG. 3A-3C. For example, an array of microtube sensors 162 can be provided on a sensor plate 66, whereby the spacing of the microtube sensors 162 corresponds to a spacing of the gas nozzles 22. Alternately, the microtube sensors 162 can be provided in conjunction with a plurality of pressure sensors 70 to display or measure a gas flow rate alongside a pressure of gas exiting individual gas nozzles 22 of the gas plate 26.

In still a further embodiment (as shown, for example, in FIG. 11), the gas nozzle measurement apparatus 20 comprises a sensor plate 66 comprising a transparent wafer 166 having a film heater 168, which may optionally be supplied by a voltage source 90, that provides a uniform heat input to be cooled to different extents across its area depending upon the mass flow of the impinging gas stream 38. Mapping of the resultant pattern of gas streams 38 emanated from a plurality of gas nozzles 22 of the gas plate 26 can be accomplished by recording the resultant thermal image display with conventional thermal imaging devices (such as an infrared camera 154) and analyzing the signals or image with the signal processor 92, which correlates the thermal variations to the gas flow rate, density, velocity or pressure of the gas stream 38 passing through each gas nozzle 22.

In another embodiment (as shown, for example, in FIG. 12), the gas nozzle measurement apparatus 20 comprises a sensor plate 66 comprising a substrate having a chemically-reactive coating 170 which reacts to produce a discernible change in color (or other physical property) due to physical and/or chemical reaction upon impingement of a gas stream 38 from a gas nozzle 22 of a gas plate 26. The gas flow applied to the back face 30 of the gas plate 26 is mixed with atomized or liquid chemical 171 which is reactive with the chemically-reactive coating 170 on the substrate. The properties of the gas stream 38 passing through a gas nozzle 22 of the gas plate 26 are measured by observing the pattern created in the chemically-reactive coating 170 on the substrate, such as with a camera 169, to provide a display of the gas flow rate, density, velocity or pressure of the gas stream 38 passing through each gas nozzle 22.

In another embodiment, the gas nozzle measurement apparatus 20 comprises a sensor plate 66 comprising a tensioned polarizing film 172, as shown in FIG. 13. Impinging gas streams 38 create a display of a stress pattern on the tensioned polarizing film 172 that can be imaged and recorded, such as with a camera 169, and then correlated to flow from each gas nozzle 22 of a gas plate 26. The resultant image on the tensioned polarizing film 172 provides a display of the gas flow rate, density, velocity or pressure of the gas stream 38 passing through each gas nozzle 22.

In another embodiment, the gas nozzle measurement apparatus 20 comprises a sensor vessel 174 comprising a viscous sensing fluid 176, as shown in FIG. 14A-B. The sensor vessel 174 can be a small container such as an open cylindrical tank. The viscous sensing fluid 176 is held in the sensor vessel 174. During measurement of the gas flow properties of gas nozzles 22 of a gas plate 26, the surface of the viscous sensing fluid 176 receives a plurality of gas streams 38 emanating from the gas nozzles 22 of the gas plate 26. By nature of its viscosity, the viscous sensing fluid 176 generates a display that retains a measurement memory of the gas pressure, flow rate, density, or velocity of each of the gas streams 38 from the different gas nozzles 22 of the gas plate 26 to provide a display of the gas flow rate or pressure of the gas stream 38 passing through each gas nozzle 22. In this technique, the viscous sensing fluid 176 should have a viscosity which is sufficiently high to maintain the memory of the gas flow distribution, and sufficiently low to allow deformation of the fluid surface with the impinging pressure or flow of gas applied through the gas nozzles 22. In the deformed state, the variation of surface profile across the surface of the viscous sensing fluid 176 provides a display which can be measured or recorded by photographing, such as with a camera 169, of the cross-sectional profile of the fluid 176 at the surface in relation to the distribution of gas nozzles 22 across the gas plate 26. When correlated to individual gas nozzles 22, the protrusions 180 and depressions 178 on the fluid surface provide a good visual indication of the differences in pressure, flow rate, density, or velocity of the individual gas streams 38 coming from each of the gas nozzles 22 of the gas plate 26.

In yet another embodiment, the viscous sensing fluid 176 can be a fluid that sets in a relatively short time, for example, a fluid that sets in less than 5 minutes or even less than 1 minute. By "setting" it is meant that the viscous sensing fluid 176 solidifies to a form in which the viscosity of the fluid is sufficiently high that it retains its shape and does not deform under normal gravitational forces. A constant gas flow is provided at a sufficiently high pressure from the back face 30 of the gas plate 26 and passes through the gas nozzles 22 of the gas plate 26. The gas streams 38 passing through the gas nozzles 22 and impinging upon the surface of the viscous sensing fluid 176 generate a display of a series of circular depressions 178 and protrusions 180 in the fluid surface which can extend into a small thickness of the exposed portion of the fluid 176. The gas pressure and flow through the gas nozzles 22 is maintained sufficiently long time to allow the viscous sensing fluid 176 to gradually set into a surface profile pattern that reflects the pressure and gas flow distribution generated from the gas nozzles 22 across the gas plate 26 to provide a display of the gas flow rate or pressure of the gas stream 38 passing through each gas nozzle 22.

The gas nozzle measurement apparatus 20 as described above has many applications, some of which are illustrated herein, and includes other applications as would be apparent to those of ordinary skill in the art. Advantageously, the gas nozzle measurement apparatus 20 allows simultaneous display or measurement of a plurality of gas nozzles 22 of a gas plate 26, whereas, prior art nozzle measurement devices allow only measurement of a single gas nozzle 22, or the average flow characteristics of an array of nozzles 24. In contrast, the present apparatus 20 provides a much faster method of ascertaining the gas flow characteristics of the gas plate 26 having thousands of gas nozzles 22. In addition, the gas nozzle measurement apparatus 20 provides an accurate, qualitative or quantitative measure of the flow characteristics of the particular gas nozzle 22, and can even provide an accurate measurement of a pressure, flow rate, density, or velocity of the gas stream 38 passing through a gas nozzle 22.

The foregoing description of various embodiments of the invention has been provided for the purposes of understanding the invention. The description is not intended to be exhaustive or to limit the invention to precise forms described. For example, other embodiments of gas sensors 70 can be used in the gas nozzle measurement apparatus 20. Further, the present invention may be used to match the gas flow properties or three or more chambers 120. Moreover, one or more of the chambers 120 in the multiple chamber system may be configured to process simultaneously more than one substrate 122. Accordingly, numerous modifications and variations are possible in view of the teachings above.

What is claimed is:

1. A gas nozzle measurement apparatus comprising:
   (a) a controllable gas source to provide across a gas plate having gas nozzles, a flow of gas at a constant pressure or constant flow rate; and
   (b) a sensor plate sized to cover an area comprising at least a portion of the front face of the gas plate, the sensor plate comprising gas flow sensors arranged in locations that correspond to positions of individual gas nozzles of the gas plate such that each gas flow sensor can measure a pressure, flow rate, density or velocity of a gas stream passing through the individual gas nozzle that faces a gas flow sensor, and generate a signal indicative of, or display, the pressure, flow rate, density or velocity of the gas stream passing through the individual gas nozzle.

2. An apparatus according to claim 1 wherein the controllable gas source comprises a pressurized gas source connected to (i) a flow rate controller comprising a mass flow controller and a flow control valve, or (ii) a gas pressure controller comprising a gas pressure gauge and a pressure control valve.

3. An apparatus according to claim 1 wherein the gas flow sensors are capable of measuring a gas pressure of from about 30 kPa to about 3000 kPa.

4. An apparatus according to claim 1 wherein the gas flow sensors comprise piezoresistive pressure sensors.

5. An apparatus according to claim 4 wherein the piezoresistive pressure sensors comprise a silicon membrane supported by opposing supports which are bonded to a plate.

6. An apparatus according to claim 4 wherein the piezoresistive pressure sensors operate in a temperature range of from about −40° C. to about 150° C.

7. An apparatus according to claim 4 wherein the piezoresistive pressure sensors provide a change in impedance of from about 4000 ohms to about 6000 ohms in response to an applied pressure by the gas streams emanating from the gas nozzles of from 34.5 kPa to about 3447 kPa.

8. An apparatus according to claim 1 wherein each gas flow sensor of the sensor plate generates a visual display signal, or a set of gas nozzle measurement signals, of the measured pressure, flow rate, density or velocity of the gas stream passing through each individual gas nozzle.

9. An apparatus according to claim 8 further comprising a signal processor to:
   (i) determine the position of each gas flow sensor in relation to each gas nozzle and generate a plurality of gas nozzle position index signals, each gas nozzle position index signal identifying the particular gas flow sensor used to measure a particular gas nozzle;
   (ii) correlate a plurality of gas nozzle measurement signals with the plurality of gas nozzle position index signals; and
   (iii) output data displaying the pressure, flow rate, density or velocity of the gas stream passing through each gas nozzle.

10. A gas nozzle measurement apparatus comprising:
   (a) a controllable gas source to provide a flow of gas at a constant pressure or constant flow rate across gas nozzles of a gas plate;
   (b) a seed particle injector to disperse seed particles into the flow of gas;
   (c) a laser Doppler interferometer to illuminate gas streams passing through the gas nozzles of the gas plate with a plurality of laser beams of coherent light;
   (d) a plurality of electro-optical detectors to detect the intensity as a function of time of scattered light from the gas streams illuminated by the laser Doppler interferometer and generate a plurality of gas nozzle measurement signals; and
   (e) a signal processor to:
      (i) determine the position of each electro-optical detector in relation to each gas nozzle and generate a plurality of gas nozzle position index signals, each gas nozzle position index signal identifying the particular electro-optical detector used to measure a particular gas nozzle; and
      (ii) correlate the plurality of gas nozzle measurement signals with the plurality of gas nozzle position index signals, and output data displaying the gas pressure, flow rate, density, or velocity of each gas stream passing through each gas nozzle.

11. An apparatus according to claim 10 wherein the seed particle injector comprises a fluidized bed aerosol generator or atomizer.

12. An apparatus according to claim 10 wherein the seed particle injector disperses seed particles sized from about 1 micron to about 100 microns.

13. An apparatus according to claim 10 comprising a source of seed particles comprising aluminum oxide particles, titanium oxide particles, polystyrene spheres, metallic-coated glass spheres, hollow-glass spheres, or metallic-coated hollow-glass spheres.

14. An apparatus according to claim 10 wherein the laser Doppler interferometer comprises a beam splitter or an acousto-optical modulator.

15. An apparatus according to claim 10 wherein each electro-optical detector comprises a bandwidth larger than the Doppler frequency shifts of seed particles in the gas streams.

16. An apparatus according to claim 10 wherein the signal processor performs a Fourier transform on the gas nozzle measurement signals received from the electro-optical detector.

17. A gas nozzle measurement apparatus comprising:
   (a) a controllable gas source to provide a flow of gas at a constant pressure or constant flow rate across gas nozzles of a gas plate;
   (b) a seed particle injector to inject magnetic particles into the flow of gas; and
   (c) a sensor plate comprising a metal plate to receive the magnetic particles in gas streams from the gas nozzles in the gas plate.

18. A gas nozzle measurement apparatus comprising:
   (a) a controllable gas source to provide a flow of gas at a constant pressure or constant flow rate across gas nozzles of a gas plate; and
   (b) a sensor plate comprising a thermal sensing wafer capable of converting the pressure, flow rate, density, or velocity of gas streams from the gas nozzles in the gas plate impinging on the thermal sensing wafer into a thermal map.

19. An apparatus according to claim 18 comprising a heater to heat the thermal sensing wafer.

20. A gas nozzle measurement apparatus comprising:
   (a) a controllable gas source to provide a flow of gas at a constant pressure or constant flow rate across gas nozzles of a gas plate; and
   (b) a sensor plate comprising a substrate coated with a uniform coat of pressure-sensitive paint capable of changing in a property with application of a pressure from a gas stream from a gas nozzle of the gas plate.

21. A gas nozzle measurement apparatus comprising:
(a) a controllable gas source to provide a flow of gas at a constant pressure or constant flow rate across gas nozzles of a gas plate;
(b) a sensor plate comprising a transparent wafer having a film heater that provides a uniform heat input to be cooled to different extents across its area depending upon the flow of an impinging gas stream from a gas nozzle; and
(c) a thermal imaging device to record an image of the thermal variations across the wafer which result from the gas flow rate, density, velocity or pressure of each gas stream passing through each gas nozzle.

22. A gas nozzle measurement apparatus comprising:
(a) a controllable gas source to provide a flow of gas at a constant pressure or constant flow rate across gas nozzles of a gas plate; and
(b) a sensor plate comprising a substrate having a chemically-reactive coating which reacts to produce a discernible change in color upon impingement of a gas stream from a gas nozzle of the gas plate.

23. A gas nozzle measurement apparatus comprising:
(a) a controllable gas source to provide a flow of gas at a constant pressure or constant flow rate across gas nozzles of a gas plate; and
(b) a sensor vessel comprising a viscous sensing fluid that receives a plurality of gas streams emanating from the gas nozzles of the gas plate and retains a measurement memory of the pressure, flow, density or velocity of the gas streams.

24. A gas nozzle measurement apparatus comprising:
(a) a controllable gas source to provide a flow of gas at a constant pressure or constant flow rate across gas nozzles of a gas plate; and
(b) a sensor plate comprising a plurality of microtube sensors that are each capable of sensing a pressure, flow rate, density or velocity of an impinging gas stream from a gas nozzle of the gas plate, the microtube sensors being arranged in locations that correspond to positions of individual gas nozzles of the gas plate such that each microtube sensor can measure a pressure, flow rate, density or velocity of a gas stream passing through an individual gas nozzle that faces the microtube sensor.

25. A gas nozzle measurement apparatus comprising:
(a) a controllable gas source to provide a flow of gas at a constant pressure or constant flow rate across gas nozzles of a gas plate; and
(b) a sensor plate comprising thermochromic liquid crystals capable of changing the color of reflected light based on the temperature of the thermochromic liquid crystals such that the sensor plate can display a pressure, flow rate, density or velocity of a gas stream passing through an individual gas nozzle that faces the sensor plate.

26. An apparatus according to claim 17 wherein the sensor plate is magnetic.

27. An apparatus according to claim 18 further comprising temperature sensors connected to the thermal sensing wafer.

28. An apparatus according to claim 18 further comprising an infrared camera.

29. An apparatus according to claim 18 further comprising a signal processor to analyze a mapped temperature profile or captured image of the temperature distribution.

30. An apparatus according to claim 20 wherein the pressure-sensitive paint comprises luminescent molecules.

31. An apparatus according to claim 21 wherein the thermal imaging device comprises an infrared camera.

32. An apparatus according to claim 22 wherein the chemically-reactive coating is chemically-reactive to an atomized or liquid chemical which is mixed with the flow of gas.

33. An apparatus according to claim 23 wherein the sensor vessel comprises an open cylindrical tank.

34. An apparatus according to claim 23 wherein the viscous sensing fluid comprises a viscosity which is sufficiently high to maintain the memory of the gas flow distribution, and sufficiently low to allow deformation of the fluid surface with the impinging pressure or flow of gas supply through the gas nozzles.

35. An apparatus according to claim 23 wherein the viscous sensing fluid sets a less than 5 minutes.

36. An apparatus according to claim 24 wherein the microtube sensors are micro-machined from silicon, semiconductor material, quartz, ceramic, metal or composite material.

37. An apparatus according to claim 24 wherein the microtube sensors comprise electrodes to provide a frequency of vibration to the microtubes.

38. An apparatus according to claim 24 wherein the microtube sensors comprise walls capable of flexing in response to a change in pressure within the microtube.

39. An apparatus according to claim 24 wherein the microtube sensors comprise electrodes centers arranged proximate to the walls.

40. An apparatus according to claim 25 wherein the thermochromic liquid crystals comprise encapsulated liquid crystals.

41. An apparatus according to claim 25 wherein the thermochromic liquid crystals have a temperature bandwidth of from about 0.1° C. to about 30° C.

42. An apparatus according to claim 25 comprising thermochromic liquid crystals having different temperature bandwidth.

43. An apparatus according to claim 25 further comprising a camera to capture an image of the color pattern of the thermochromic liquid crystals.

* * * * *